United States Patent
Nakamoto et al.

(10) Patent No.: US 9,306,253 B2
(45) Date of Patent: Apr. 5, 2016

(54) ELECTROLYTE SOLUTION FOR LITHIUM-AIR BATTERY

(75) Inventors: Hirofumi Nakamoto, Susono (JP); Taishi Shiotsuki, Susono (JP); Atsushi Shirasawa, Suntou-gun (JP); Yushi Suzuki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/342,926

(22) PCT Filed: Jun. 15, 2012

(86) PCT No.: PCT/JP2012/065410
§ 371 (c)(1),
(2), (4) Date: Mar. 5, 2014

(87) PCT Pub. No.: WO2013/051309
PCT Pub. Date: Apr. 11, 2013

(65) Prior Publication Data
US 2014/0212772 A1      Jul. 31, 2014

(30) Foreign Application Priority Data

Oct. 7, 2011   (JP) ................ 2011-223474
Jan. 23, 2012  (JP) ................ 2012-011337

(51) Int. Cl.
- H01M 12/02    (2006.01)
- H01M 10/0568  (2010.01)
- H01M 10/0567  (2010.01)
- H01M 10/0569  (2010.01)
- H01M 12/08    (2006.01)
- H01M 10/052   (2010.01)

(52) U.S. Cl.
CPC ............ *H01M 12/02* (2013.01); *H01M 10/052* (2013.01); *H01M 10/0567* (2013.01); *H01M 10/0568* (2013.01); *H01M 10/0569* (2013.01); *H01M 12/08* (2013.01); *H01M 2300/0045* (2013.01)

(58) Field of Classification Search
CPC ..................................................... H01M 12/02
See application file for complete search history.

(56) References Cited

U.S. PATENT DOCUMENTS

2003/0205268 A1    11/2003  Nakamura et al.
2006/0166103 A1*    7/2006  Honma et al. ............. 429/339

(Continued)

FOREIGN PATENT DOCUMENTS

EP    1595863 A1   11/2005
EP    2 528 157 A1 11/2012

(Continued)

OTHER PUBLICATIONS

"Development of a New-type Lithium-Air Battery with Large Capacity", *National Institute of Advanced Industrial Science and Technology*, Feb. 24, 2009, pp. 1-4 (with translation).

(Continued)

Primary Examiner — Patrick Ryan
Assistant Examiner — Alex Usyatinsky
(74) Attorney, Agent, or Firm — Oliff PLC

(57) ABSTRACT

Provided is an electrolyte solution capable of further increasing the output of a lithium air battery, the electrolyte solution for a lithium air battery having a total bonding strength between $Li_2O_2$ is no less than 0.14.

5 Claims, 8 Drawing Sheets

(56) References Cited

U.S. PATENT DOCUMENTS

| | | | |
|---|---|---|---|
| 2007/0117007 A1 | 5/2007 | Visco et al. | |
| 2010/0266907 A1 | 10/2010 | Yazami | |
| 2012/0237838 A1* | 9/2012 | Uesaka | 429/405 |
| 2012/0290224 A1* | 11/2012 | Nishikoori et al. | 702/30 |
| 2013/0040210 A1 | 2/2013 | Mizuno et al. | |

FOREIGN PATENT DOCUMENTS

| | | | |
|---|---|---|---|
| JP | A-2005-353568 | | 12/2005 |
| JP | A-2008-293678 | | 12/2008 |
| JP | A-2010-129495 | | 6/2010 |
| JP | A-2010-170819 | | 8/2010 |
| JP | A-2011-3313 | | 1/2011 |
| JP | A-2011-14478 | | 1/2011 |
| JP | A-2011-96492 | | 5/2011 |
| JP | A-2011-108499 | | 6/2011 |
| JP | WO2011086701 | * | 7/2011 |
| JP | A-2011-238404 | | 11/2011 |
| JP | 5621745 B2 | | 11/2014 |
| WO | WO 2005/109562 A1 | | 11/2005 |
| WO | WO 2011/086701 A1 | | 7/2011 |
| WO | WO 2011/111185 A1 | | 9/2011 |

OTHER PUBLICATIONS

Hideaki Shirota et al: "Heavy Atom Substitution Effects in Non-Aromatic Ionic Liquids Ultrafast Dynamics and Physical Properties," The Journal of Physical Chemistry B, vol. 114, No. 29, Jul. 1, 2010, pp. 9400-9412.

* cited by examiner

ELECTROLYTE SOLUTION FOR LITHIUM-AIR BATTERY

TECHNICAL FIELD

The present invention relates to an electrolyte solution that is to be used for a lithium-air battery.

BACKGROUND ART

With the popularity and continuing development of devices such as cellular phones in recent years, higher capacities are being desired for the batteries used as power sources. Of particular note are metal-air batteries, as high-capacity batteries that have high energy density and are superior to the currently widely used lithium ion batteries, because oxygen in the air is used as the positive electrode active material to conduct oxidation-reduction reaction of the oxygen at the air electrode, while at the negative electrode, oxidation-reduction reaction of the metal composing the negative electrode is conducted, thereby allowing charge or discharge (NPL 1).

Organic solvents have conventionally been used as non-aqueous electrolytes in metal-air batteries, but the organic solvents are volatile and have problems of miscibility with water, and therefore stability for prolonged operation has been an issue. Prolonged battery operation is associated with risks, as the battery resistance increases with volatilization of the electrolyte solution from the positive electrode (air electrode) end, or penetration of moisture into the battery results in corrosion of the metal lithium serving as the negative electrode. This phenomenon can lead to loss of the prolonged discharge capacity that is a feature of air batteries.

An air battery employing an ionic liquid such as N-methyl-N-propylpiperidinium bis(trifluoromethanesulfonyl)amide (PP13TFSA) as the non-aqueous electrolyte has been proposed (PTL 1), with the aim of providing a lithium-air battery that inhibits reduction of the electrolyte solution due to volatility and inclusion of moisture into the battery, and that is capable of stable battery operation for long periods. An ionic liquid is a substance composed of ion molecules that are combinations of cations and anions, and that is liquid at ordinary temperature (15° C. to 25° C.)

CITATION LIST

Patent Literature

[PTL 1] Japanese Unexamined Patent Publication No. 2011-14478

Non-Patent Literature

[NPL 1] National Institute of Advanced Industrial Science and Technology (AIST), "Development of high performance lithium-air battery with novel structure" [online], Feb. 24, 2009 release [Aug. 19, 2011 search] Internet: <http://www.aist.go.jp/aist_j/press_release/pr2009/pr20090224/pr20090224.html>

DISCLOSURE OF THE INVENTION

Problems to be Solved by the Invention

Although using an ionic liquid such as N-methyl-N-propylpiperidinium bis(trifluoromethanesulfonyl)amide (PP13TFSA) as the electrolyte solution for an air battery can produce a certain effect of limiting reduction of the electrolyte solution by volatilization and limiting inclusion of moisture into the battery, air batteries employing conventional ionic liquids, such as PP13TFSA, as electrolyte solutions still cannot be considered to have adequate output as batteries. Consequently, electrolyte solutions which can further increase output for lithium-air batteries have been desired.

Means for Solving the Problems

Based on diligent research on electrolyte solutions that are able to further increase output for lithium-air batteries, the inventors found that an electrolyte solution with high solubility for the $Li_2O_2$ that deposits during discharge of a lithium-air battery, can contribute to increased output of the lithium-air battery, and arrived at an electrolyte solution with high $Li_2O_2$ solubility.

The present invention is an electrolyte solution to be used in a lithium-air battery, comprising an ionic liquid that contains a hydrocarbon group and an electron-donating functional group, wherein the lithium ion affinity of the electron-donating functional group is higher than the lithium ion affinity of the hydrocarbon group.

Effect of the Invention

According to the invention, it is possible to provide an electrolyte solution with excellent solubility for $Li_2O_2$, which is a precipitate during discharge of a lithium-air battery.

DESCRIPTION OF EMBODIMENTS

Embodiment 1

Electrolyte Solution Suitable for Lithium-Air Battery

Figure 1:
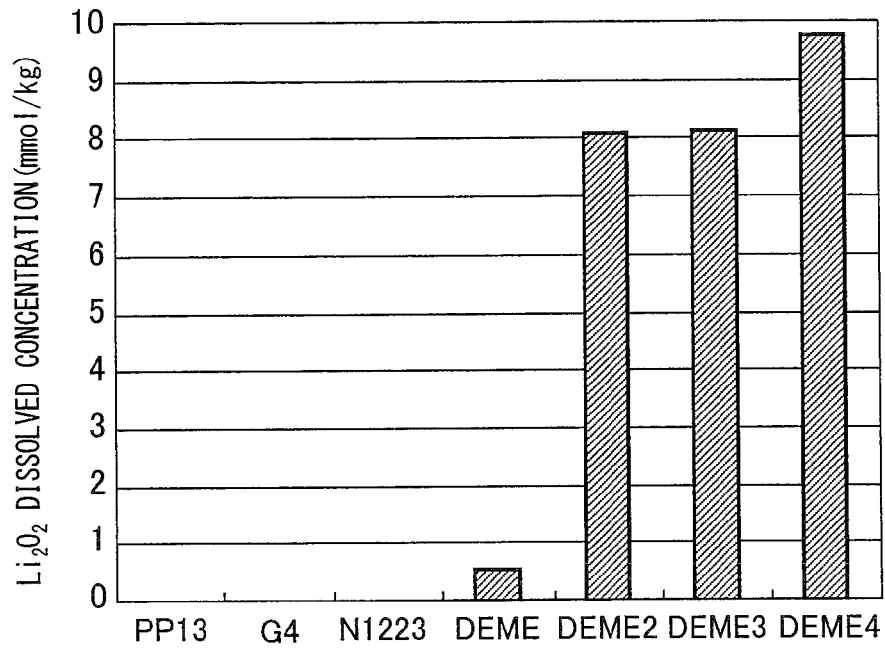
FIG. 1 is a graph showing $Li_2O_2$ dissolving concentrations in electrolyte solutions.

Lithium-air batteries employing electrolyte solutions containing N-methyl-N-propylpiperidinium bis(trifluoromethanesulfonyl)amide (hereunder, PP13TFSA) as conventionally used ionic liquids, still cannot satisfy output demands for batteries. One reason for this is that the insulating lithium oxide that is a precipitate of discharge essentially does not dissolve in PP13TFSA, and accumulation of the discharge precipitate increases the resistance inside the lithium-air battery and lowers the current density of discharge.

Therefore, the electrolyte solutions used in lithium-air batteries are desired to be electrolyte solutions with excellent solubility for the lithium oxides which are insulating precipitates and may be produced during discharge of lithium-air batteries.

As an electrolyte solution to be used in such a lithium-air battery, the inventors found an electrolyte solution having total bonding strength with $Li_2O_2$, as an oxide of lithium, of 0.14 or greater and preferably 0.20 or greater. The total bonding strength is the total of the bonding strength between the electrolyte solution and $Li_2O_2$, with a larger numerical value indicating higher $Li_2O_2$ solubility. The total bonding strength is calculated in the following manner by quantum chemical computation: (1) the $Li_2O_2$ is structurally optimized, (2) a molecular model of a single solvent molecule or cation used in the electrolyte solution is constructed and structurally optimized, (3) the $Li_2O_2$ molecule structurally optimized in (1) is configured at various positions near the molecular model of a single solvent molecule or cation that has been structurally optimized in (2), and the entire system is structurally optimized, (4) the total energy, interatomic distances and interatomic bond orders (Wiberg bond indexes) are calculated for the entire system, (5) stable structures within +10 kcal/mol of the structure with the lowest total energy calculated in (4) are selected, (6) bonds with interatomic distances of no greater than 2.1 angstrom between the configured $Li_2O_2$ and the solvent molecule are selected from among the stable structures selected in (5), and (7) the total bond order of the bonds selected in (6) and the number of stable structures with the bonds selected in (6) are calculated, and the total bonding strength per stable structure can be calculated by the following formula:

Total bonding strength=(total bond order of bonds selected in (6))/(number of stable structures with bonds selected in (6)).

In (5), stable structures within +10 kcal/mol from the structure with the lowest total energy are selected because structures having total energies exceeding +10 kcal/mol have low stability at room temperature compared to the structure with the minimum total energy. Also in (6), bonds with interatomic distances of no greater than 2.1 angstrom between the configured $Li_2O_2$ and the solvent molecule are selected because solvents with interatomic distances of greater than 2.1 angstrom between $Li_2O_2$ are not bonded with $Li_2O_2$.

By increasing the solubility of lithium oxides, such as $Li_2O_2$, in the electrolyte solution, it is possible to minimize accumulation of discharge precipitation in the lithium-air battery. This can minimize blockage of the passageway for lithium ions and oxygen gas in the lithium-air battery, thereby allowing increased discharge capacity, increased coulombic efficiency and less output reduction during discharge for the lithium-air battery.

The electrolyte solution of the invention has excellent $Li_2O_2$ solubility, and can dissolve $Li_2O_2$ to preferably 0.005 mol/L or greater and more preferably 0.1 mol/L or greater.

An electrolyte solution with a total bonding strength of 0.14 or greater with $Li_2O_2$ according to the invention may be an ionic liquid, organic solvent or the like, and is preferably an electrolyte solution containing an ionic liquid that includes a hydrocarbon group and an electron-donating functional group, the electron-donating functional group having higher affinity with lithium ions than the hydrocarbon group. The inventors found that if an electron-donating functional group that readily coordinates with lithium ion is incorporated in the electrolyte solution, it is possible to increase the solubility of insulating lithium oxides, such as $Li_2O_2$, which are discharge precipitates, in the electrolyte solution.

The ionic liquid containing a hydrocarbon group and an electron-donating functional group may contain a quaternary ammonium cation represented by formula (1).

[Chemical Formula 1]

(1)

(In the formula, R1, R2, R3 and R4 each include 1-8 carbon atoms, and further include a hydrogen, oxygen, nitrogen and/or sulfur atom, with an electron-donating functional group being included in at least one of R1, R2, R3 and R4.)

As used herein, a "hydrocarbon group" is a group comprising a carbon atom and hydrogen, including alkyl groups, such as methyl and ethyl, and a "electron-donating functional group" is a functional group containing an oxygen atom, nitrogen atom or sulfur atom, with examples of functional groups containing oxygen atoms including —O—, —CO— and —COO—, examples of functional groups containing nitrogen atoms including —CN and —NRaRb (Ra and Rb are hydrocarbon groups), and functional groups containing sulfur atoms including —NS and —SH.

The ionic liquid containing a hydrocarbon group and an electron-donating functional group of embodiment 1 is preferably an ionic liquid containing N,N-diethyl-N-methyl-N-(2-methoxyethyl)ammonium (DEME) represented by formula (2), which includes an ether group, and more preferably it is an ionic liquid that is a DEME-based ionic liquid containing two or more ether groups, for example, N,N-diethyl-N-methyl-N-(2-methoxyethoxyethyl)ammonium (DEME2) represented by formula (3) which contains two ether groups, an ammonium (DEME3) represented by formula (4) which contains three ether groups, an ammonium (DEME4) represented by formula (5) which contains four ether groups, or mixtures thereof.

PP13 represented by formula (6) has a different structure from DEME-based compounds and does not contain an electron-donating functional group, such as an ether group that is present in DEME-based compounds, and therefore it has low solubility for lithium oxides, such as $Li_2O_2$. Also, tetraglyme (G4) represented by formula (7) is an organic solvent having an ether group but with a structure different from DEME-based compounds, and therefore it has low solubility for lithium oxides, such as $Li_2O_2$. As a reference example for comparison there is shown N,N-diethyl-N-methyl-N-propylammonium (N1223) having a structure similar to DEME. The inventors found that, as seen in formula (8), N1223 has a structure similar to DEME but contains no electron-donating functional group, such as an ether group, and therefore its solubility for lithium oxides, such as $Li_2O_2$, was low.

[Chemical Formula 2]

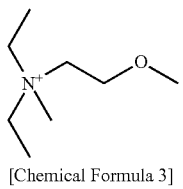

(2)

[Chemical Formula 3]

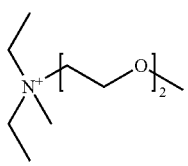

(3)

[Chemical Formula 4]

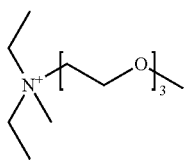

(4)

[Chemical Formula 5]

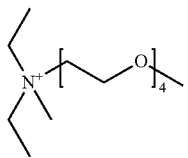

(5)

[Cemical Formula 6]

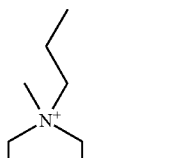

(6)

[Chemical Formula 7]

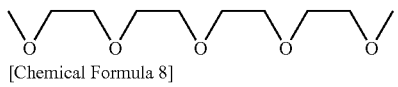

(7)

[Chemical Formula 8]

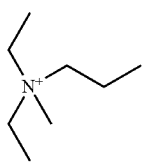

(8)

The ionic liquid containing a hydrocarbon group and an electron-donating functional group according to embodiment 1 may contain a quaternary ammonium cation with a cyclic structure represented by formula (9) and an ether group. Quaternary ammonium cations represented by formula (9) also have high total bonding strength with $Li_2O_2$ and high solubility for $Li_2O_2$, similar to ammonium cations represented by formula (1). The number of ether groups in formula (9) may be 1 to 4. The ammonium cation represented by formula (9) may be used in combination with DEME, DEME2, DEME3 and DEME4, or mixtures thereof.

[Chemical Formula 9]

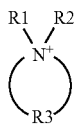

(9)

(In the formula, R1 and R2 each contain 1 to 8 carbon atoms and further contain a hydrogen atom, oxygen atom nitrogen atom and/or sulfur atom, R3 contains 2 to 7 carbon atoms and further contains a hydrogen atom, oxygen atom, nitrogen atom and/or sulfur atom, and an electron-donating functional group is present in at least one of R1, R2 and R3, with preferably an electron-donating functional group being present in at least one of R1 and R2.)

The ionic liquid containing an ammonium cation with a cyclic structure and an ether group is preferably an ionic liquid containing N-methyl-N-methoxyethyl-piperidinium (PP1.1o2) represented by formula (10).

[Chemical Formula 10]

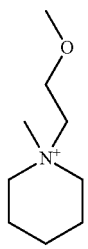

(10)

Cations are adsorbed onto the electrode surface during discharge of a lithium-air battery. When a cation with a cyclic structure and an ether group is used in the ionic liquid, this can produce excellent solubility for lithium oxides, such as $Li_2O_2$, while ensuring suitable space on the electrode surface, and can help prevent inhibition of the supply of Li ion and oxygen which are reaction starting materials, allow easier production of lithium oxides and improve the power density of the lithium-air battery.

An ionic liquid containing a DEME-based structure of any one of formulas (2) to (5), a cyclic structure of formula (9) or a mixture thereof as the cationic portion according to embodiment 1 may also contain an anionic portion. The anionic portion used may be bis(trifluoromethanesulfonyl)amide (TFSA) represented by formula (11), a tetrafluoroborate, hexafluorophosphate, triflate or the like, and is preferably TFSA, and an ionic liquid of DEMETFSA, DEME2TFSA, DEME3TFSA, DEME4TFSA, PP1.1o2TFSA or a mixture thereof may be suitably used as an electrolyte solution for a lithium-air battery.

[Chemical Formula 11]

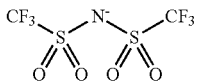

(11)

An electrolyte solution containing an ionic liquid of DEMETFSA, DEME2TFSA, DEME3TFSA, DEME4TFSA, PP1.1o2TFSA, or a mixture thereof, according to embodiment 1, may also include a lithium-containing metal salt. The lithium-containing metal salt may be a salt comprising lithium ion and any of the following anions:

halide anions, such as $Cl^-$, $Br^-$ and $I^-$; boride anions, such as $BF_4^-$, $B(CN)_4^-$ and $B(C_2O_4)_2^-$; amide anions or imide anions, such as $(CN)_2N^-$, $[N(CF_3)_2]^-$ and $[N(SO_2CF_3)_2]^-$; sulfate anions or sulfonate anions, such as $RSO_3^-$ (hereunder, R denotes an aliphatic hydrocarbon or aromatic hydrocarbon group), $RSO_4^-$, $R^f SO_3^-$ (hereunder, $R^f$ denotes a fluorine-containing halogenated hydrocarbon group), and $R^f SO_4^-$; phosphorus-containing anions, such as $R^f{}_2P(O)O^-$, $PF_6^-$ and $R^f{}_3PF_3^-$; antimony-containing anions, such as $SbF_6$; or anions, such as lactate, nitrate ion, trifluoroacetate and tris (trifluoromethanesulfonyl) methide, examples thereof including $LiPF_6$, $LiBF_4$, lithium bis(trifluoromethanesulfonyl)amide ($LiN(CF_3SO_2)_2$, hereunder "LiTFSA"), $LiCF_3SO_3$, $LiC_4F_9SO_3$, $LiC(CF_3SO_2)_3$ and $LiClO_4$, with LiTFSA being preferably used. Two or more such lithium-containing metal salts may also be used in combination. Also, there is no particular restriction on the amount of lithium-containing metal salt added to the ionic liquid, but it is preferably about 0.1 to 1 mol/kg.

The electrolyte solution containing an ionic liquid that includes a hydrocarbon group and an electron-donating functional group according to embodiment 1 may be used to produce a lithium-air battery. The lithium-air battery may have a positive electrode (air electrode) layer, a negative electrode layer and an electrolyte layer situated between the positive electrode layer and the negative electrode layer, wherein the electrolyte layer contains an electrolyte solution containing an ionic liquid that includes a hydrocarbon group and an electron-donating functional group.

The electrolyte solution containing an ionic liquid that includes a hydrocarbon group and an electron-donating functional group allows exchange of metal ions between the positive electrode layer and the negative electrode layer.

As the electrolyte there may be used the ionic liquid that includes the hydrocarbon group and the electron-donating functional group, or the ionic liquid that includes the hydrocarbon group and electron-donating functional group with further addition of another ionic liquid, such as PP13TFSA, and/or an organic solvent, such as propylene carbonate, ethylene carbonate, diethyl carbonate, dimethyl carbonate, ethylmethyl carbonate, 1,2-dimethoxyethane, 1,2-diethoxyethane, acetonitrile, propionitrile, tetrahydrofuran, 2-methyltetrahydrofuran, dioxane, 1,3-dioxolane, nitromethane, N,N-dimethylformamide, dimethyl sulfoxide, sulfolane, γ-butyrolactone, and a glyme.

The electrolyte solution used is preferably a mixture of an ionic liquid and an organic solvent. If an organic solvent with a lower viscosity than the ionic liquid is used in combination with an ionic liquid as the electrolyte solution, it will be possible to obtain excellent solubility for lithium oxides while also lowering the viscosity of the electrolyte solution, and to dissolve the lithium oxides during discharge of the lithium-air battery to ensure a diffusion channel for lithium ions and oxygen molecules while allowing the low-viscosity electrolyte solution to rapidly provide Li ions and oxygen molecules to the electrodes, to allow the output characteristics of the lithium-air battery to be improved.

The ionic liquid that may be used in admixture with an organic solvent is preferably DEME, DEME2, DEME3 or DEME4, or a mixture thereof, and more preferably it is DEME2, DEME3 or DEME4 or a mixture thereof.

Organic solvents to be used in admixture with the ionic liquid include solvents that have lower viscosity than the ionic liquid and are compatible with the ionic liquid, and that do not contain active protons. The organic solvent is preferably an organic solvent with an ether group, and more preferably a glyme. Glymes include tetraglyme and triglyme, and a glyme is preferably used as mixture with DEME, DEME2, DEME3 or DEME4, or a mixture thereof.

The proportion (molar ratio %) of organic solvent with respect to the total amount of electrolyte solution solvent containing the ionic liquid and organic solvent is preferably no greater than 98%, more preferably no greater than 95%, even more preferably no greater than 93.3%, yet more preferably no greater than 68% and most preferably no greater than 50%.

Also, the electrolyte used may be a polymer electrolyte or gel electrolyte containing an electrolyte solution containing an ionic liquid that includes a hydrocarbon group and an electron-donating functional group.

The polymer electrolyte to be used together with the electrolyte solution containing an ionic liquid that includes a hydrocarbon group and an electron-donating functional group is preferably one containing a lithium salt and a polymer. The lithium salt is not particularly restricted so long as it is a lithium salt that is generally used in the prior art in lithium-air batteries and the like, and examples include lithium salts used as the aforementioned lithium-containing metal salts. The polymer is also not particularly restricted so long as it forms a complex with the lithium salt, and examples include polyethylene oxide.

The gel electrolyte to be used together with the electrolyte solution containing an ionic liquid that includes a hydrocarbon group and an electron-donating functional group are preferably ones that contain a lithium salt, a polymer and a non-aqueous solvent. The lithium salt used may be any of the lithium salts mentioned above. The non-aqueous solvent is not particularly restricted so long as it can dissolve the lithium salt, and the aforementioned organic solvents may be used, for example. These non-aqueous solvents may be used alone, or two or more may be used in admixture. The polymer is not particularly restricted so long as it is capable of gelling, and examples include polyethylene oxide, polypropylene oxide, polyacrylonitrile, polyvinylidene fluoride (PVDF), polyurethane, polyacrylate, cellulose and the like.

A lithium-air battery using an electrolyte solution containing an ionic liquid that includes a hydrocarbon group and an electron-donating functional group according to embodiment 1 can exhibit increased T-V characteristics compared to a lithium-air battery using a conventional ionic liquid, such as PP13TFSA, as the electrolyte solution. This is because an electrolyte solution containing an ionic liquid that includes a hydrocarbon group and an electron-donating functional group as mentioned in embodiment 1 has high solubility for insulating lithium oxides, such as $Li_2O_2$, that are deposited during discharge, and can therefore inhibit the increase in resistance inside the battery that accompanies discharge. A lithium-air battery using an electrolyte solution containing an ionic liquid that includes a hydrocarbon group and an electron-donating functional group according to embodiment 1 can also increase the coulombic efficiency compared to a lithium-air battery using a conventional ionic liquid, such as PP13TFSA, as the electrolyte solution.

Embodiment 2

Electrolyte Solution Suitable for Air Battery

Air batteries employing conventionally used ionic liquids, such as N-methyl-N-propylpiperidinium bis(trifluoromethanesulfonyl)amide (hereunder, PP13TFSA), as electrolyte solutions, still cannot satisfy output demands for batteries.

The inventors conducted diligent research on electrolyte solutions that can increase output of air batteries compared to conventional electrolyte solutions, and focusing on the oxygen supply capacity of the electrolyte solution as an index, they found an ionic liquid having several ether groups incorporated in a cationic structure, as an electrolyte solution suitable for an air battery. Ether groups readily coordinate with lithium ions, and therefore incorporating several ether groups into the cationic structure can increase the oxygen supply property by causing interaction between the lithium ions coordinated in the cations and the oxygen molecules, and can increase the output of the air battery. It is believed that facilitating coordination of the lithium ions and the cations compared to the anions of the ionic liquid makes it possible to cause diffusion of the lithium ions and oxygen molecules together and to aid movement of the oxygen gas, thereby promoting increased oxygen supply capacity.

By using an ionic liquid with several ether groups incorporated into the cationic structure as the electrolyte solution for an air battery, it is possible to further increase the current density during discharge of the air battery, and to achieve improved I-V characteristics. Improved I-V characteristics means increased output as a battery.

The ionic liquid having several ether groups incorporated into the cationic structure may contain an ammonium cation represented by formula (12).

[Chemical Formula 12]

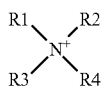

(12)

(In the formula, R1, R2, R3 and R4 each include 1-4 carbon atoms, and further include a hydrogen and/or oxygen atom, with a total of 1 to 2 oxygen atoms in R1, R2, R3 and R4.)

The oxygen supply capacity is an index of the ability to supply oxygen by the electrolyte solution, with a larger numerical value allowing more supply of oxygen and larger output as an air battery. The oxygen supply capacity is the numerical value obtained by multiplying the dissolved concentration of oxygen in the electrolyte solution ($C[\text{mol}\cdot\text{cm}^{-3}]$) by the diffusion coefficient of oxygen in the electrolyte solution ($D[\text{cm}^2\cdot\text{s}^{-1}]$), and is represented by the following formula:

Oxygen supply capacity=$C\times\sqrt{D}[\text{mol}\cdot\text{cm}^{-2}\cdot\text{s}^{-0.5}]$. [Formula 1]

Although there is no limitation to any particular theory, the air battery has a laminated structure comprising a positive electrode layer (air electrode layer), electrolyte layer and negative electrode layer, wherein oxygen passes through the positive electrode layer, and react with negative electrode metal ions at the interface between the electrolyte layer and the positive electrode layer (the reaction site). If the oxygen supply capacity of the electrolyte solution is high, this will promote diffusion and dissolution of oxygen in the positive electrode layer and diffusion and dissolution of oxygen at the reaction site, thus increasing the current density during discharge.

The ionic liquid having several ether groups incorporated into the cationic structure, according to embodiment 2, is preferably an ionic liquid wherein the cationic structure of the ionic liquid is a N,N-diethyl-N-methyl-N-(2-methoxyethyl) ammonium (DEME)-based structure. DEME-based structures include N,N-diethyl-N-methyl-N-(2-methoxyethyl) ammonium (DEME) having one ether group, represented by formula (13), and N,N-diethyl-N-methyl-N-(2-methoxyethoxyethyl)ammonium (DEME2) having two ether groups, represented by formula (14). When an electrolyte solution containing an ionic liquid that includes DEME or DEME2 is used in an air battery, movement of oxygen gas will be even further facilitated and it will be possible to obtain an air battery with improved I-V characteristics. An ionic liquid containing DEME2 in the cationic portion is preferably used.

[Chemical Formula 13]

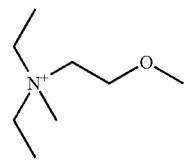

(13)

[Chemical Formula 14]

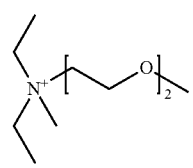

(14)

PP13 represented by formula (15) has a structure different from DEME and contains no ether group, and therefore has low oxygen supply capacity.

[Chemical Formula 15]

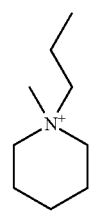

(15)

An ionic liquid containing the DEME-based structure of formula (13) or (14) as the cationic portion may include an anionic portion. The anionic portion used may be bis(trifluoromethanesulfonyl)amide (TFSA) represented by formula (16), a tetrafluoroborate, hexafluorophosphate, triflate or the like, and is preferably bis(trifluoromethanesulfonyl)amide (TFSA), and an ionic liquid of DEMETFSA, DEME2TFSA, or a mixture thereof may be suitably used as an electrolyte solution for a lithium-air battery.

[Chemical Formula 16]

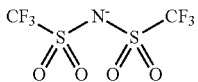

(16)

The electrolyte solution containing an ionic liquid of DEMETFSA, DEME2TFSA, or a mixture thereof, according to embodiment 2, may also include a lithium-containing metal salt. The lithium-containing metal salt may be a salt comprising lithium ion and any of the following anions:

halide anions, such as Cl⁻, Br⁻ and I⁻; boride anions, such as $BF_4^-$, $B(CN)_4^-$ and $B(C_2O_4)_2^-$; amide anions or imide anions, such as $(CN)_2N^-$, $[N(CF_3)_2]^-$ and $[N(SO_2CF_3)_2]^-$; sulfate anions or sulfonate anions, such as $RSO_3^-$ (hereunder, R denotes an aliphatic hydrocarbon or aromatic hydrocarbon group), $RSO_4^-$, $R^fSO_3^-$ (hereunder, $R^f$ denotes a fluorine-containing halogenated hydrocarbon group), and $R^fSO_4^-$; phosphate anions, such as $R^f{}_2P(O)O^-$, $PF_6^-$ and $R^f{}_3PF_3^-$; antimony anions, such as $SbF_6^-$; or anions, such as lactate, nitrate ion and trifluoroacetate, examples thereof including $LiPF_6$, $LiBF_4$, lithium bis(trifluoromethanesulfonyl)amide ($LiN(CF_3SO_2)_2$, hereunder "LiTFSA"), $LiCF_3SO_3$, $LiC_4F_9SO_3$, $LiC(CF_3SO_2)_3$ and $LiClO_4$, with LiTFSA being preferably used. Two or more such lithium-containing metal salts may also be used in combination. Also, there is no particular restriction on the amount of lithium-containing metal salt added to the ionic liquid, but it is preferably about 0.1 to 1 mol/kg.

The electrolyte solution containing an ionic liquid that includes an ether group in the cationic structure according to embodiment 2 may be used to fabricate an air battery. The air battery may have a positive electrode (air electrode) layer, a negative electrode layer and an electrolyte layer situated between the positive electrode layer and the negative electrode layer, wherein the electrolyte layer contains an electrolyte solution containing an ionic liquid that includes an ether group in the cationic structure.

The electrolyte solution containing an ionic liquid that includes an ether group in the cationic structure allows exchange of metal ions between the positive electrode layer and the negative electrode layer.

As the electrolyte there may be used the ionic liquid that includes an ether group in the cationic structure, or the ionic liquid that includes an ether group in the cationic structure with further addition of another ionic liquid, such as PP13TFSA, or an organic solvent, such as propylene carbonate, ethylene carbonate, diethyl carbonate, dimethyl carbonate, ethylmethyl carbonate, 1,2-dimethoxyethane, 1,2-diethoxyethane, acetonitrile, propionitrile, tetrahydrofuran, 2-methyltetrahydrofuran, dioxane, 1,3-dioxolane, nitromethane, N,N-dimethylformamide, dimethyl sulfoxide, sulfolane, γ-butyrolactone, and a glyme.

Also, the electrolyte used may be a polymer electrolyte or gel electrolyte containing an electrolyte solution containing an ionic liquid that includes an ether group in the cationic structure. The polymer electrolyte to be used together with the electrolyte solution containing an ionic liquid that includes an ether group in the cationic structure is preferably one containing a lithium salt and a polymer. The lithium salt is not particularly restricted so long as it is a lithium salt that is generally used in the prior art in lithium-air batteries and the like, and examples include lithium salts used as the aforementioned lithium-containing metal salts. The polymer is also not particularly restricted so long as it forms a complex with the lithium salt, and examples include polyethylene oxide.

The gel electrolyte to be used together with the electrolyte solution containing an ionic liquid that includes an ether group in the cationic structure is preferably one containing a lithium salt, a polymer and a non-aqueous solvent. The lithium salt used may be any of the lithium salts mentioned above. The non-aqueous solvent is not particularly restricted so long as it can dissolve the lithium salt, and the aforementioned organic solvents may be used, for example. These non-aqueous solvents may be used alone, or two or more may be used in admixture. The polymer is not particularly restricted so long as it is capable of gelling, and examples include polyethylene oxide, polypropylene oxide, polyacrylonitrile, polyvinylidene fluoride (PVDF), polyurethane, polyacrylate, cellulose and the like.

A lithium-air battery using an electrolyte solution containing an ionic liquid that includes an ether group in the cationic structure according to embodiment 2 can exhibit increased I-V characteristics compared to an air battery using a conventional ionic liquid, such as PP13TFSA, as the electrolyte solution. This is because an electrolyte solution containing an ionic liquid with an ether group in the cationic structure according to embodiment 2 has high oxygen supply capacity.

Embodiment 3

Electrolyte Solution Suitable for Lithium Ion Battery

Multiple ion components are present in a conventionally used ionic liquid, such as N-methyl-N-propylpiperidinium bis(trifluoromethanesulfonyl)amide (hereunder, "PP13TFSA), and therefore, components other than the target ions (such as lithium ion) may be transported. Consequently, it has been an issue that the lithium ion conductivity is lowered and it is no longer possible for all of the charge energy to be utilized as discharge energy, such that high coulombic efficiency cannot be obtained.

The inventors conducted diligent research on electrolyte solutions that can increase the lithium ion transport number compared to conventional electrolyte solutions, and they found an ionic liquid having several ether groups incorporated in a cationic structure. Ether groups readily coordinate with lithium, and by incorporating several ether groups into the cationic structure, the lithium ions are more easily dissociated from the anions of the ionic liquid. This allows easier delivery of lithium ions between the cations and anions and facilitates movement of lithium ions, thus improving the lithium ion transport property.

The ionic liquid having several ether groups incorporated into the cationic structure may contain an ammonium cation represented by formula (17).

[Chemical Formula 17]

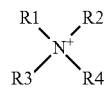

(17)

(In the formula, R1, R2, R3 and R4 each include 1 to 8 carbon atoms, and further include a hydrogen and/or oxygen atom, with a total of 2 to 4 oxygen atoms in R1, R2, R3 and R4.)

The ionic liquids with several ether groups incorporated into the cationic structure according to embodiment 3 include N,N-diethyl-N-methyl-N-(2-methoxyethoxyethyl)ammonium (DEME2) represented by formula (18) which contains two ether groups, an ammonium (DEME3) represented by formula (19) which contains three ether groups, an ammonium (DEME4) represented by formula (20) which contains four ether groups, and mixtures thereof.

N,N-diethyl-N-methyl-N-(2-methoxyethyl)ammonium (DEME) represented by formula (21) has one ether group, while the conventionally used PP13 represented by formula (22) has a different structure from DEME and contains no ether groups, and therefore has a low lithium ion transport number.

[Chemical Formula 18]

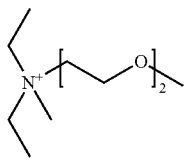
(18)

[Chemical Formula 19]

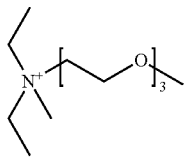
(19)

[Chemical Formula 20]

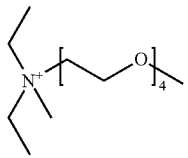
(20)

[Chemical Formula 21]

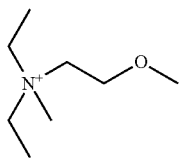
(21)

[Chemical Formula 22]

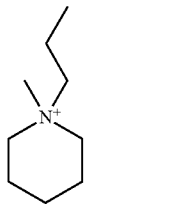
(22)

The ionic liquid containing the DEME-based structure with several ether groups represented by any of formulas (18) to (20) as the cationic portion may include an anionic portion. The anionic portion is preferably bis(trifluoromethanesulfonyl)amide (TFSA) represented by formula (23), a tetrafluoroborate, hexafluorophosphate, triflate or the like, with preferably bis(trifluoromethanesulfonyl)amide (TFSA) being used, and the ionic liquid of DEME2TFSA, DEME3TFSA, DEME4TFSA, or a mixture thereof may be suitably used as an electrolyte solution for a lithium ion battery.

[Chemical Formula 23]

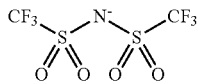
(23)

The DEME-based ionic liquid of embodiment 3, which is a DEME-based ionic liquid having several ether groups incorporated into the cationic structure; is preferably used as an electrolyte solution for a lithium ion battery. A larger number of ether groups will tend to increase the ability of lithium to coordinate with the cation, and facilitate dissociation of lithium ions from the anions, while at the same time it is preferred for lithium ion to be easily transported. Therefore, the number of ether groups in the DEME-based ionic liquid is preferably 2 to 4.

The electrolyte solution containing the ionic liquid of DEME2TFSA, DEME3TFSA, DEME4TFSA, or a mixture thereof according to embodiment 3 may also include a lithium-containing metal salt. The lithium-containing metal salt may be a salt comprising lithium ion and any of the following anions:

halide anions, such as $Cl^-$, $Br^-$ and $I^-$; boride anions, such as $BF_4^-$, $B(CN)_4^-$ and $B(C_2O_4)_2^-$; amide anions or imide anions, such as $(CN)_2N^-$, $[N(CF_3)_2]^-$ and $[N(SO_2CF_3)_2]^-$; sulfate anions or sulfonate anions, such as $RSO_3^-$ (hereunder, R denotes an aliphatic hydrocarbon or aromatic hydrocarbon group), $RSO_4^-$, $R^fSO_3^-$ (hereunder, $R^f$ denotes a fluorine-containing halogenated hydrocarbon group), and $R^fSO_4^-$; phosphate anions, such as $R^f{}_2P(O)O^-$, $PF_6^-$ and $R^f{}_3PF_3^-$; antimony anions, such as $SbF_6^-$; or anions, such as lactate, nitrate ion and trifluoroacetate, examples thereof including $LiPF_6$, $LiBF_4$, lithium bis(trifluoromethanesulfonyl)amide ($LiN(CF_3SO_2)_2$, hereunder "LiTFSA"), $LiCF_3SO_3$, $LiC_4F_9SO_3$, $LiC(CF_3SO_2)_3$ and $LiClO_4$, with LiTFSA being preferably used. Two or more such lithium-containing metal salts may also be used in combination. Also, there is no particular restriction on the amount of lithium-containing metal salt added to the ionic liquid, but it is preferably about 0.1 to 1 mol/kg.

The electrolyte solution containing the ionic liquid of DEME2TFSA, DEME3TFSA, DEME4TFSA, or a mixture thereof, according to embodiment 3, may be applied to lithium ion batteries, including lithium-air batteries. This is because using the electrolyte solution containing the ionic liquid of DEME2TFSA, DEME3TFSA, DEME4TFSA, or a mixture thereof, results in excellent lithium ion transport properties. For example, the lithium ion battery may have a positive electrode layer, a negative electrode layer and an electrolyte layer situated between the positive electrode layer and the negative electrode layer, wherein the electrolyte layer contains the electrolyte solution containing the ionic liquid of DEME2TFSA, DEME3TFSA, DEME4TFSA, or a mixture thereof.

The electrolyte solution containing the ionic liquid of DEME2TFSA, DEME3TFSA, DEME4TFSA, or a mixture thereof, according to embodiment 3, allows exchange of metal ions between the positive electrode layer and the negative electrode layer.

As the electrolyte there may be used the ionic liquid of DEME2TFSA, DEME3TFSA, DEME4TFSA or a mixture thereof, or the ionic liquid of DEME2TFSA, DEME3TFSA, DEME4TFSA or a mixture thereof with further addition of another ionic liquid, such as PP13TFSA, or an organic solvent, such as propylene carbonate, ethylene carbonate, diethyl carbonate, dimethyl carbonate, ethylmethyl carbonate, 1,2-dimethoxyethane, 1,2-diethoxyethane, acetonitrile, propionitrile, tetrahydrofuran, 2-methyltetrahydrofuran, dioxane, 1,3-dioxolane, nitromethane, N,N-dimethylformamide, dimethyl sulfoxide, sulfolane, γ-butyrolactone, and a glyme.

The electrolyte used may also be a polymer electrolyte or gel electrolyte containing an electrolyte solution containing an ionic liquid of DEME2TFSA, DEME3TFSA, DEME4TFSA or a mixture thereof.

The polymer electrolytes that can be used together with the electrolyte solution containing the ionic liquid of DEME2TFSA, DEME3TFSA, DEME4TFSA or a mixture thereof, according to embodiment 3, are preferably those containing a lithium salt and a polymer. The lithium salt is not particularly restricted so long as it is a lithium salt that is generally used in the prior art in lithium-air batteries and the like, and examples include lithium salts used as the aforementioned lithium-containing metal salts. The polymer is also not particularly restricted so long as it forms a complex with the lithium salt, and examples include polyethylene oxide.

The gel electrolytes that can be used together with the electrolyte solution containing the ionic liquid of DEME2TFSA, DEME3TFSA, DEME4TFSA or a mixture thereof, according to embodiment 3, are preferably those containing a lithium salt, a polymer and a non-aqueous solvent. The lithium salt used may be any of the lithium salts mentioned above. The non-aqueous solvent is not particularly restricted so long as it can dissolve the lithium salt, and the aforementioned organic solvents may be used, for example. These non-aqueous solvents may be used alone, or two or more may be used in admixture. The polymer is not particularly restricted so long as it is capable of gelling, and examples include polyethylene oxide, polypropylene oxide, polyacrylonitrile, polyvinylidene fluoride (PVDF), polyurethane, polyacrylate, cellulose and the like.

The electrolyte solution described for embodiment 1 may be suitably used in a lithium-air battery, the electrolyte solution described for embodiment 2 may be suitably used for air batteries, and the electrolyte solution described for embodiment 3 may be suitably used for lithium ion batteries.

The air battery in which the electrolyte solution described for embodiment 2 may be suitably used may contain a positive electrode (air electrode) layer, a negative electrode layer and an electrolyte layer situated between the positive electrode layer and the negative electrode layer.

The positive electrode (air electrode) layer may contain a conductive material. Carbon is an example of the conductive material, and the carbon materials include carbon blacks, such as Ketchen black, acetylene black, channel black, furnace black and mesoporous carbon, active carbon, carbon fibers and the like, among which carbon materials with high specific surface area are preferably used.

The positive electrode (air electrode) layer may also contain a binder. Examples of the binders include fluorine-based resins, such as polytetrafluoroethylene (PTFE), polyvinylidene fluoride (PVDF) and fluorine rubber, thermoplastic resins, such as polypropylene, polyethylene and polyacrylonitrile, and styrene-butadiene rubber (SBR).

The positive electrode (air electrode) layer may contain an oxidation-reduction catalyst The oxidation-reduction catalysts include metal oxides, such as manganese dioxide, cobalt oxide and cerium oxide, noble metals, such as Pt and Pd, transition metals, such as Co, and metal phthalocyanines, such as cobalt phthalocyanine.

In the air battery with a positive electrode (air electrode) layer, a negative electrode layer and an electrolyte layer between the positive electrode layer and negative electrode layer, the electrolyte layer conducts metal ions between the positive electrode layer and the negative electrode layer, and it may contain the electrolyte solution described for embodiment 2.

In the air battery, a separator may also be provided between the positive electrode layer and the negative electrode layer. There are no particular restrictions on the separator, and for example, there may be used a polymer nonwoven fabric, such as a polypropylene nonwoven fabric and polyphenylene sulfide nonwoven fabric, a fine porous film, such as an olefin-based resin including polyethylene or polypropylene, or a combination thereof. The electrolyte solution described for embodiment 2 may be impregnated into a separator to form an electrolyte layer.

The negative electrode layer in the air battery is a layer containing a negative electrode active material. For example, the negative electrode active material may be a metal, alloy material or carbon material, and examples include alkali metals, such as lithium, sodium and potassium, alkaline earth metals, such as magnesium and calcium, Group 13 elements, such as aluminum, transition metals, such as zinc and iron, and alloy materials or carbon materials containing these metals.

Also, as the negative electrode active material there may be used an alloy, oxide, nitride or sulfide containing the element lithium. Examples of the alloys containing the element lithium include lithium aluminum alloy, lithium tin alloy, lithium lead alloy and lithium silicon alloy. Examples of the metal oxides containing the element lithium include lithium titanate. Examples of the metal nitrides containing the element lithium include lithium cobalt nitride, lithium iron nitride and lithium manganese nitride.

The negative electrode layer to be used in the air battery may further contain a conducting material and/or binder. For example, when the negative electrode active material is in the form of a foil, the negative electrode layer may contain the negative electrode active material alone, or when the negative electrode active material is in powdered form, the negative electrode layer may have the negative electrode active material and a binder. As the conducting material and binder, the same materials as in the positive electrode layer may be used.

Covering materials that may be used in the air battery may be materials that are commonly used as covering materials for air batteries, such as metal cans and resins and laminate packs.

The covering material may have holes for oxygen supply provided at any desired locations. For example, they may be provided facing the contact surface of the positive electrode layer with air.

In the air battery, an oxygen permeation film may be situated on the positive electrode layer, on the side in contact with the air, on the side opposite the electrolyte layer side. The oxygen permeation film may be a water-repellent porous film or the like that allows oxygen in the air to pass through while preventing approach of moisture, and for example, a porous film made of polyester or polyphenylene sulfide may be used. A water-repellent film may also be separately provided.

In the air battery, a positive electrode collector may be situated adjacent to the positive electrode layer. The positive electrode collector may usually be situated on the positive electrode layer, on the side in contact with air on the opposite side from the electrolyte layer, but it may also be situated between the positive electrode layer and the electrolyte layer. The positive electrode collector to be used is not particularly restricted so long as it is a material used in the prior art as a collector, and for example, a porous structure, a mesh-like structure, fibers, nonwoven fabric or the like, such as carbon paper or metal mesh, may be used. For example, metal meshes made of SUS, nickel, aluminum, iron, titanium or the like may be used. A metal foil with oxygen supply holes may also be used as the positive electrode collector.

In the air battery, a negative electrode collector may be situated adjacent to the negative electrode layer. The negative electrode collector to be used is not particularly restricted so long as it is a material used in the prior art as a negative electrode collector, such as a conductive substrate with a porous structure or a non-porous metal foil, and for example, metal foils made of copper, SUS, nickel or the like may be used.

The form of the air battery is not particularly restricted so long as it is a form with oxygen intake holes, and it may have any desired form such as a cylindrical, rectilinear, button-shaped, coin-shaped or flat form.

The air battery can be used as a secondary battery, but it may also be used as a primary battery.

Formation of the positive electrode layer, electrolyte layer and negative electrode layer in the air battery can be accomplished by any desired method carried out in the prior art. For example, for formation of a positive electrode layer containing carbon particles and a binder, an appropriate amount of solvent, such as ethanol, is added to a prescribed amount of carbon particles and a binder and mixed therewith, the obtained mixture is rolled to a prescribed thickness with a roll press and then dried and cut, optionally sandwiched by mesh-like collectors and pressure-bonded together, and then hot vacuum-dried, to obtain a positive electrode layer bonded to a collector. As a separate method, an appropriate amount of a solvent, such as ethanol, may be added to a prescribed amount of carbon particles and a binder and mixed therewith to obtain a slurry, and the slurry is coated onto a substrate and dried to obtain a positive electrode layer. The obtained positive electrode layer may optionally be subjected to press molding. The coating process for the positive electrode layer onto the substrate may be doctor blading, gravure transfer or the like. The substrate used is not particularly restricted, and it may be the current collector to be used as the collector, a film-like substrate with flexibility, a hard substrate, or the like, and for example, it may be a substrate such as a SUS foil, polyethylene terephthalate (PET) film or TEFLON®.

The electrolyte solution described for embodiment 1 can be suitably used in a lithium-air battery. The lithium-air battery is the air battery described above wherein the negative electrode active material contains a lithium-containing material and the ion conduction is performed by lithium ions, while the rest of the battery structure is the same as the air battery described above.

The electrolyte solution described for embodiment 3 can be suitably used as an electrolyte solution to be included in lithium ion batteries in general, including the aforementioned air battery. Common lithium ion batteries are provided with a positive electrode layer, a negative electrode layer and an electrolyte layer situated between them, and the electrolyte solution described for embodiment 3 may be included in the electrolyte layer.

The positive electrode layer and the negative electrode layer of a common lithium ion battery each include an active material. The active material to be used as the positive electrode active material may be a material that exhibits an electropositive potential as the charge-discharge potential with respect to a material used as the negative electrode active material, and that can be used as an electrode active material. Examples of materials for the main body of the positive electrode active material particles include lithium cobaltate (LiCoO$_2$), lithium nickelate (LiNiO$_2$), lithium manganate (LiMn$_2$O$_4$), LiCo$_{1/3}$Ni$_{1/3}$Mn$_{1/3}$O$_2$, hetero-element-substituted Li—Mn spinel having a composition represented by Li$_{1+x}$Mn$_{2-x-y}$M$_y$O$_4$ (wherein M is one or more metal elements selected from among Al, Mg, Co, Fe, Ni and Zn), lithium titanate (Li$_x$TiO$_y$), lithium metal phosphates (LiMPO$_4$, wherein M is Fe, Mn, Co or Ni), transition metal oxides, such as niobium oxide (Nb$_2$O$_5$), vanadium oxide (V$_2$O$_5$) and molybdenum oxide (MoO$_3$), titanium sulfide (TiS$_2$), carbon materials, such as graphite and hard carbon, lithium cobalt nitride (LiCoN), lithium silicon oxides (Li$_x$Si$_y$O$_z$), lithium metal (Li), lithium alloys (LiM, wherein M is Sn, Si, Al, Ge, Sb or P), lithium storage intermetallic compounds (Mg$_x$M or N$_y$Sb, wherein M is Sn, Ge or Sb, and N is In, Cu or Mn), and also derivatives thereof. There is no clear distinction between positive electrode active materials and negative electrode active materials, and a battery with the desired voltage can be constructed by comparing the charge-discharge potentials of two materials and using the one exhibiting an electropositive charge-discharge potential as the positive electrode and the one exhibiting an electronegative potential as the negative electrode.

In the lithium ion battery, a positive electrode collector may be situated adjacent to the positive electrode layer. The positive electrode collector is not particularly restricted, and for example, a metal foil with a thickness of about 10 to 500 μm, such as Al, Cu, Ni or stainless steel, may be used.

In the lithium ion battery, a negative electrode collector may be situated adjacent to the negative electrode layer. The material of the negative electrode collector is not particularly restricted so long as it has conductivity, and examples include SUS, copper, nickel and carbon, with SUS and copper being preferred. Also, the negative electrode collector may be in the form of a foil, sheet or mesh, for example, with a foil being preferred.

The lithium ion battery containing the electrolyte solution described for embodiment 3 may have a cylindrical, rectilinear, button-shaped, coin-shaped or flat-shaped form, with no limitation to these.

EXAMPLES (Preparation of Solvent)

A solvent for use in an electrolyte solution was prepared. The compounds N,N-diethyl-N-methyl-N-(2-methoxyethyl) ammonium bis(trifluoromethanesulfonyl)amide (DEMETFSA), N,N-diethyl-N-methyl-N-propylammonium bis(trifluoromethanesulfonyl)amide (N1223TFSA) and N-methyl-N-propylpiperidinium bis(trifluoromethanesulfonyl)amide (PP13TFSA) were procured from Kanto Kagaku Co., Ltd. Tetraglyme (G4) was procured from Kishida Chemical Co., Ltd. The compound N-methyl-N-methoxyethyl-piperidinium bis(trifluoromethanesulfonyl)amide (PP1.1o2TFSA) was procured from Merck Corp. DEME2TFSA, DEME3TFSA and DEME4TFSA were synthesized by changing 1-bromo-2-methoxyethane, which is a starting material for synthesis of the publicly known substance DEMETFSA, to 1-bromo-2-(2-methoxyethoxy) ethane, diethylene glycol-2-bromoethyl methyl ether and triethylene glycol-2-bromoethyl methyl ether, respectively.

(Li$_2$O$_2$ Solubility Evaluation)

Example 1-1

Using DEMETFSA (product of Kanto Kagaku Co., Ltd.) as the solvent, lithium peroxide (Li$_2$O$_2$, product of Kojundo Chemical Laboratory Co., Ltd.) was weighed to a concentration of 0.5 mol/kg under an Ar atmosphere at 25° C. and mixed and immersed therein for 10 days, and the supernatant liquid was separated to prepare an electrolyte solution for evaluation of $Li_2O_2$ solubility.

Example 2-1

Using DEME2TFSA as the solvent, lithium peroxide ($Li_2O_2$, product of Kojundo Chemical Laboratory Co., Ltd.) was weighed to a concentration of 0.5 mol/kg under an Ar atmosphere at 25° C. and mixed and immersed therein for 10 days, and the supernatant liquid was separated to prepare an electrolyte solution for evaluation of $Li_2O_2$ solubility.

Example 3-1

Using DEME3TFSA as the solvent, lithium peroxide ($Li_2O_2$, product of Kojundo Chemical Laboratory Co., Ltd.) was weighed to a concentration of 0.5 mol/kg under an Ar atmosphere at 25° C. and mixed and immersed therein for 10 days, and the supernatant liquid was separated to prepare an electrolyte solution for evaluation of $Li_2O_2$ solubility.

Example 4-1

Using DEME4TFSA as the solvent, lithium peroxide ($Li_2O_2$, product of Kojundo Chemical Laboratory Co., Ltd.) was weighed to a concentration of 0.5 mol/kg under an Ar atmosphere at 25° C. and mixed and immersed therein for 10 days, and the supernatant liquid was separated to prepare an electrolyte solution for evaluation of $Li_2O_2$ solubility.

Comparative Example 1-1

Using PP13TFSA (product of Kanto Kagaku Co., Ltd.) as the solvent, lithium peroxide ($Li_2O_2$, product of Kojundo Chemical Laboratory Co., Ltd.) was weighed to a concentration of 0.5 mol/kg under an Ar atmosphere at 25° C. and mixed and immersed therein for 10 days, and the supernatant liquid was separated to prepare an electrolyte solution for evaluation of $Li_2O_2$ solubility.

Comparative Example 2-1

Using tetraglyme (G4, product of Kishida Chemical Co., Ltd.) as the solvent, lithium peroxide ($Li_2O_2$, product of Kojundo Chemical Laboratory Co., Ltd.) was weighed to a concentration of 0.5 mol/kg under an Ar atmosphere at 25° C. and mixed and immersed therein for 10 days, and the supernatant liquid was separated to prepare an electrolyte solution for evaluation of $Li_2O_2$ solubility.

Reference Example 1-1

Using N1223TFSA (product of Kanto Kagaku Co., Ltd.) as the solvent, lithium peroxide ($Li_2O_2$, product of Kojundo Chemical Laboratory Co., Ltd.) was weighed to a concentration of 0.5 mol/kg under an Ar atmosphere at 25° C. and mixed and immersed therein for 10 days, and the supernatant liquid was separated to prepare an electrolyte solution for evaluation of $Li_2O_2$ solubility.

(Measurement of $Li_2O_2$ Dissolved Concentration of Each Electrolyte Solution)

The $Li_2O_2$ dissolved concentrations were compared for each of DEMETFSA, DEME2TFSA, DEME3TFSA, DEME4TFSA, PP13TFSA, G4 and N1223TFSA prepared in admixture with lithium peroxide.

A double-tube and a reference material (a solution of $LiPF_6$ in ethyl methyl carbonate at a concentration of 1 mol/L) having a known dissolving concentration for lithium compounds were prepared, and the prepared electrolyte solution for evaluation of $Li_2O_2$ solubility was placed in the outer tube of the double-tube, the reference material was placed in the inner tube of the double-tube, and $^7$Li-NMR (INOVA300, product of Varian, Inc.) was conducted at 25° C. After measuring the integral ratio of the peak for $Li_2O_2$ obtained for the evaluation electrolyte solution with respect to the peak for $LiPF_6$ measured for the reference material, the peak integral ratio and the amount ratio of the liquids in the inner tube and the outer tube of the double-tube were used for calculation to determine the $Li_2O_2$ dissolved concentration in the evaluation electrolyte solution.

FIG. 1 is a graph showing $Li_2O_2$-dissolved concentration in each electrolyte solution. PP13TFSA, G4 and N1223TFSA were not able to dissolve $Li_2O_2$, but DEMETFSA, DEME2TFSA, DEME3TFSA and DEME4TFSA had $Li_2O_2$ dissolved concentrations of 0.6 mmol/kg, 8.1 mmol/kg, 8.1 mmol/kg and 9.8 mmol/kg, respectively. Among DEMETFSA, DEME2TFSA, DEME3TFSA and DEME4TFSA, a larger number of ether groups tended to exhibit an increased $Li_2O_2$ dissolved concentration, and a particularly high $Li_2O_2$ dissolved concentration was exhibited with two or more ether groups. These results indicated that DEME having an ether group, DEME having two or more ether groups, and especially DEME having 2 to 4 ether groups, as electron-donating functional groups with high lithium ion affinity, have excellent $Li_2O_2$ solubility, and are especially suited as electrolyte solutions for lithium-air batteries.

(Measurement of Oxygen Supply Capacity)

Ionic liquids of DEMETFSA, DEME2TFSA, DEME3TFSA, DEME4TFSA and PP13TFSA were used for electrochemical measurement under the following conditions to determine the oxygen supply capacities.

There were prepared an airtight three-electrode measuring cell comprising glassy carbon as the work electrode (diameter: 3 mm), Ag/Ag$^+$ as the reference electrode, and Ni as the counter electrode, and a potentiostat/galvanostat (Solartron) as the measuring apparatus. The measuring cells containing each of the ionic liquids were allowed to stand for 3 hours in a thermostatic bath at 25° C., 1 atmosphere, the atmosphere in the measuring cells was exchanged with an argon atmosphere, and the ionic liquid was then bubbled with pure oxygen for 30 minutes while exchanging with an oxygen atmosphere. Next, cyclic voltammetry (CV) measurement was conducted at 25° C. in an oxygen atmosphere at 1 atmosphere, in the range of −1.7 to 1.3 V v.s. Ag/Ag$^+$, at a sweep voltage of 10 mV/s. The potential which was assumed to be a diffusion-controlled state from the cyclic voltammetry (CV) was then used to perform a potential step chronoamperometry measurement, and the Cottrell formula:

$$|i| = nFC\sqrt{\frac{D}{\pi \cdot t}} \qquad \text{[Formula 2]}$$

(wherein i [A/cm$^{-2}$] is the critical current density, n is the number of reaction electrons and 1, F[C·mol$^{-1}$] is Faraday's constant (96,500 C/mol), C[mol·cm$^{-3}$] is the oxygen concentration and D [cm$^2$·s$^{-1}$] is the diffusion coefficient) was used for calculation of:

$$\text{Oxygen supply capacity} = C \times \sqrt{D} \text{ [mol·cm}^{-2}\text{·s}^{-0.5}] \qquad \text{[formula 3]}$$

from the critical current density i measured with respect to the reciprocal of the square root of time t.

Figure 2:
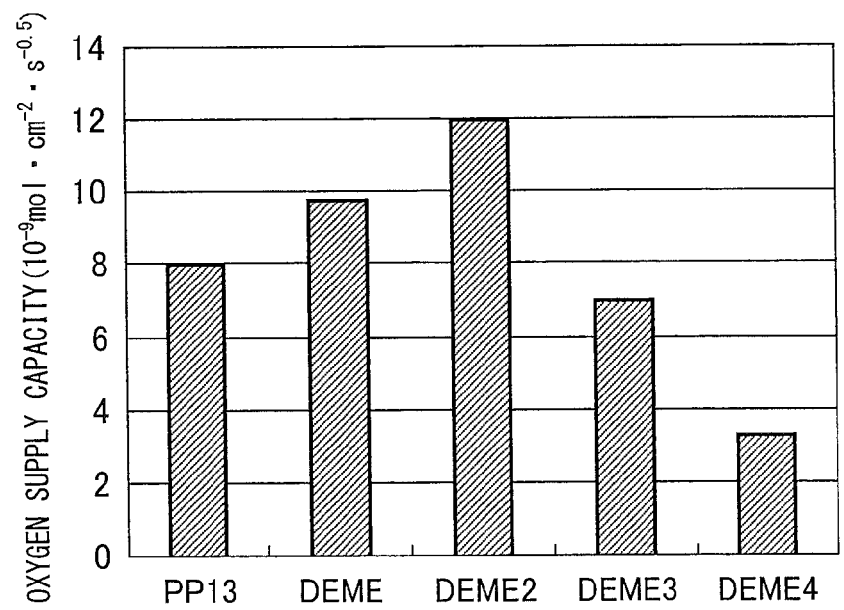
FIG. 2 is a graph showing oxygen supply capacities of ionic liquids.

FIG. 2 shows a graph comparing oxygen supply capacities measured for different ionic liquids. The oxygen supply capacities ($10^{-9}$ mol·cm$^{-2}$·s$^{-0.5}$) were 9.8 for DEMETFSA, 12.0 for DEME2TFSA, 7.0 for DEME3TFSA, 3.3 for DEME4TFSA and 8.0 for PP13TFSA. DEMETFSA and DEME2TFSA had higher oxygen supply capacities, in particular, DEME2TFSA with two ether groups exhibited higher oxygen supply capacity, and they were therefore shown to be suitable as electrolyte solutions for a lithium-air battery. DEME3TFSA and DEME4TFSA had lower oxygen supply capacities, and this is because their large molecular sizes and high viscosities inhibited movement of oxygen.

(Evaluation of Lithium Ion Transport Number and Evaluation of Ease of Lithium Oxide Production)

Example 1-2

Using DEMETFSA (product of Kanto Kagaku Co., Ltd.) as the solvent, lithium bis(trifluoromethanesulfonyl)amide (LiTFSA, product of Kojundo Chemical Laboratory Co., Ltd.) was measured out to a concentration of 0.35 mol/kg under an Ar atmosphere at 60° C. and mixed therewith, and the mixture was stirred for 6 hours to prepare an electrolyte solution.

Example 2-2

Using DEME2TFSA as the solvent, lithium bis(trifluoromethanesulfonyl)amide (LiTFSA, product of Kojundo Chemical Laboratory Co., Ltd.) was measured out to a concentration of 0.35 mol/kg under an Ar atmosphere at 60° C. and mixed therewith, and the mixture was stirred for 6 hours to prepare an electrolyte solution.

Example 3-2

Using DEME3TFSA as the solvent, lithium bis(trifluoromethanesulfonyl)amide (LiTFSA, product of Kojundo Chemical Laboratory Co., Ltd.) was measured out to a concentration of 0.35 mol/kg under an Ar atmosphere at 60° C. and mixed therewith, and the mixture was stirred for 6 hours to prepare an electrolyte solution.

Example 4-2

Using DEME4TFSA as the solvent, lithium bis(trifluoromethanesulfonyl)amide (LiTFSA, product of Kojundo Chemical Laboratory Co., Ltd.) was measured out to a concentration of 0.35 mol/kg under an Ar atmosphere at 60° C. and mixed therewith, and the mixture was stirred for 6 hours to prepare an electrolyte solution.

Example 5-2

Using N-methyl-N-methoxyethyl-piperidinium bis(trifluoromethanesulfonyl)amide (PP1.1o2TFSA, product of Merck) as the solvent, lithium bis(trifluoromethanesulfonyl)amide (LiTFSA, product of Kojundo Chemical Laboratory Co., Ltd.) was measured out to a concentration of 0.35 mol/kg under an Ar atmosphere at 60° C. and mixed therewith, and the mixture was stirred for 6 hours to prepare an electrolyte solution.

Comparative Example 1-2

Using PP13TFSA (product of Kanto Kagaku Co., Ltd.) as the solvent, lithium bis(trifluoromethanesulfonyl)amide (LiTFSA, product of Kojundo Chemical Laboratory Co., Ltd.) was measured out to a concentration of 0.35 mol/kg under an Ar atmosphere at 60° C. and mixed therewith, and the mixture was stirred for 6 hours to prepare an electrolyte solution.

(Measurement of Lithium Ion Transport Number)

For the lithium ion transport numbers of electrolyte solutions of DEMETFSA, DEME2TFSA, DEME3TFSA, DEME4TFSA and PP13TFSA prepared with admixture of LiTFSA, the diffusion coefficients of $^7$Li (Li cation), $^1$H (cation) and $^{19}$F (anion) ($D_{Li}$, $D_H$, $D_F$) at 60° C. were measured by magnetic field gradient NMR (INOVA300 by Varian), and the lithium ion transport number $t_{Li}$ of each was determined by the following formula.

$$T_{Li} = (\text{amount of lithium ion diffusion})/(\text{amount of cation diffusion} + \text{amount of anion diffusion}) = C_{LiTFSA} \times D_{Li}/\{C_{LiTFSA} \times D_{Li} + [C_{LiTFSA} + (1000 - C_{LiTFSA} \times (\text{LiTFSA molecular weight}))/(\text{ionic liquid molecular weight})] \times D_F + (1000 - C_{LiTFSA} \times (\text{LiTFSA molecular weight}))/(\text{ionic liquid molecular weight}) \times D_H\}$$

(wherein, $C_{LiTFSA}$ represents the LiTFSA concentration.)

Figure 3:
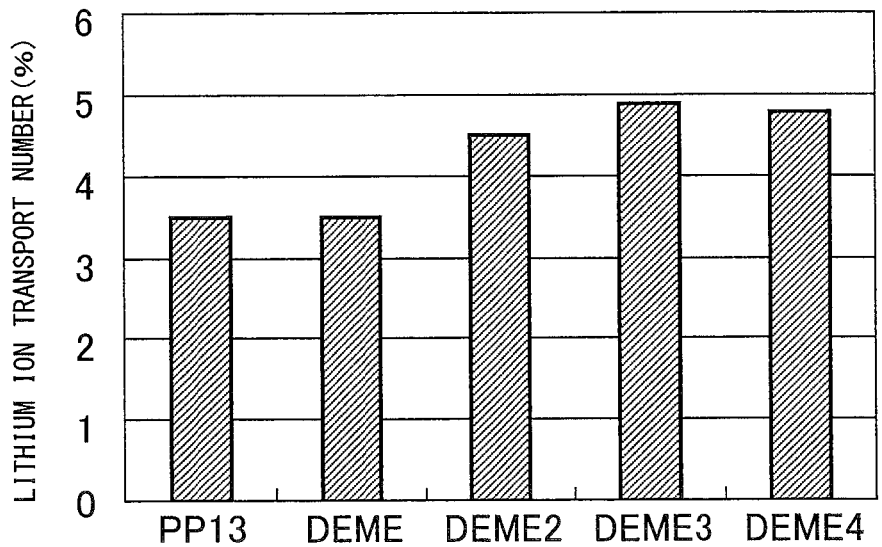
FIG. 3 is a graph showing lithium ion transport numbers of electrolyte solutions.

FIG. 3 shows a graph comparing the lithium ion transport numbers at 60° C. for different electrolyte solutions. The lithium ion transport numbers were 3.5% for DEMETFSA, 4.5% for DEME2TFSA, 4.9% for DEME3TFSA, 4.8% for DEME4TFSA and 3.5% for PP13TFSA. This demonstrated that electrolyte solutions dissolving LiTFSA in DEME having two or more ether groups, and especially DEME2 to DEME4 having 2 to 4 ether groups, are particularly suitable as electrolyte solutions for a lithium ion battery.

(Evaluation of Ease of Lithium Oxide Production)

The electrolyte solutions prepared for Examples 1-2 and 5-2 were subjected to electrochemical measurement under the following conditions and the ease of lithium oxide production was evaluated.

There were prepared an airtight three-electrode measuring cell comprising glassy carbon as the work electrode (diameter: 3 mm), Ag/Ag$^+$ as the reference electrode, and Ni as the counter electrode, and a potentiostat/galvanostat (Solartron) as the measuring apparatus. The measuring cells containing each of the electrolyte solutions were allowed to stand for 3 hours in a thermostatic bath at 60° C., 1 atmosphere, the atmosphere in the measuring cells was exchanged with an argon atmosphere, and the ionic liquid was then bubbled with pure oxygen for 30 minutes while exchanging with an oxygen atmosphere. Next, a linear sweep voltammetry (LSV) measurement was conducted at 60° C. in an oxygen atmosphere at 1 atmosphere, in the range of 1.0 to −1.3 V v.s. Ag/Ag$^+$.

Figure 10:
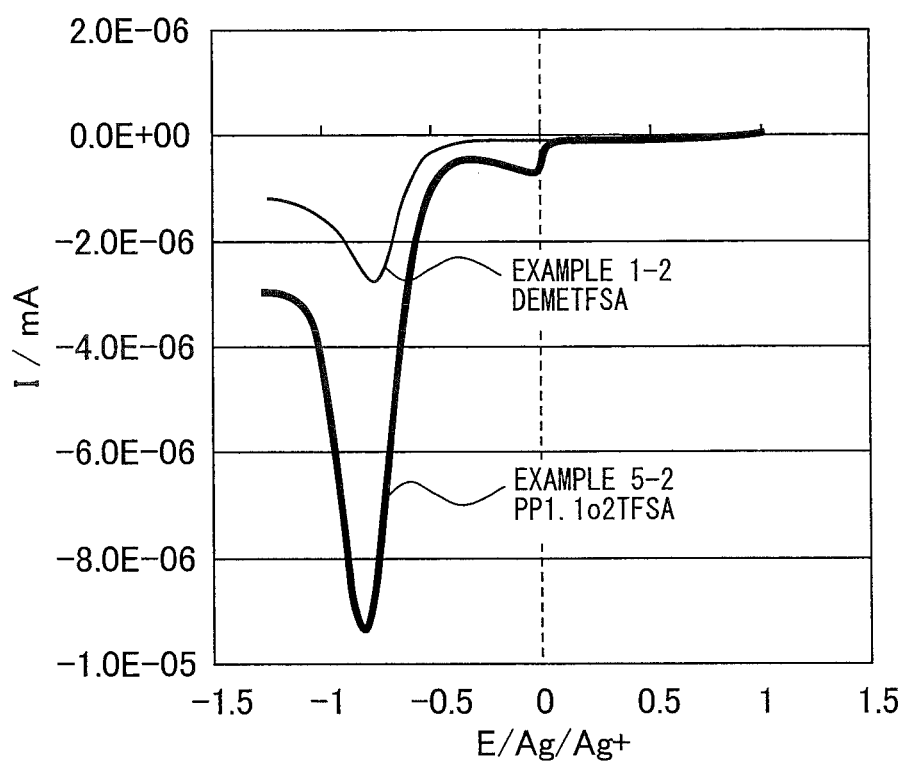
FIG. 10 shows linear sweep voltammetry (LSV) curves measured for electrolyte solutions.

FIG. 10 shows the LSV curve measured for each electrolyte solution. It shows that lithium oxide was produced in the electrolyte solution containing DEMETFSA prepared in Example 1-2, and lithium oxide was more easily produced in the electrolyte solution containing PP1.1o2TFSA prepared in Example 5-2.

(Evaluation of I-V Characteristic and Coulombic Efficiency)

Example 1-3

90 mass % of carbon black (ECP600JD by Ketjen Black International), 10 mass % of a polytetrafluoroethylene (PTFE) binder (product of Daikin Industries, Ltd.) and an appropriate amount of ethanol as the solvent were mixed to obtain a mixture. Next, the obtained mixture was rolled with a roll press and dried and cut. A SUS304 100 mesh (product of Nilaco Corp.) was used as a collector, the cut mixture and the collector were pressure-bonded, and this was then subjected to hot vacuum drying to form a positive electrode layer with a diameter of 18 mm and a thickness of 150 μm, pressure-bonded to the mesh-like collector.

Using DEMETFSA as the solvent, lithium bis(trifluoromethanesulfonyl)amide (LiTFSA, product of Kojundo Chemical Laboratory Co., Ltd.) which was a lithium salt was mixed at a concentration of 0.35 mol/kg at 60° C. for 5 hours under an Ar atmosphere and dissolved to prepare an electrolyte solution.

As a negative electrode layer there was prepared a metal lithium foil (product of Honjo Metal Co., Ltd.) with a diameter of 18 mm and a thickness of 250 and this was attached to a SUS304 (product of Nilaco Corp.) collector with a diameter of 18 mm and a thickness of 2 cm.

Figure 5:
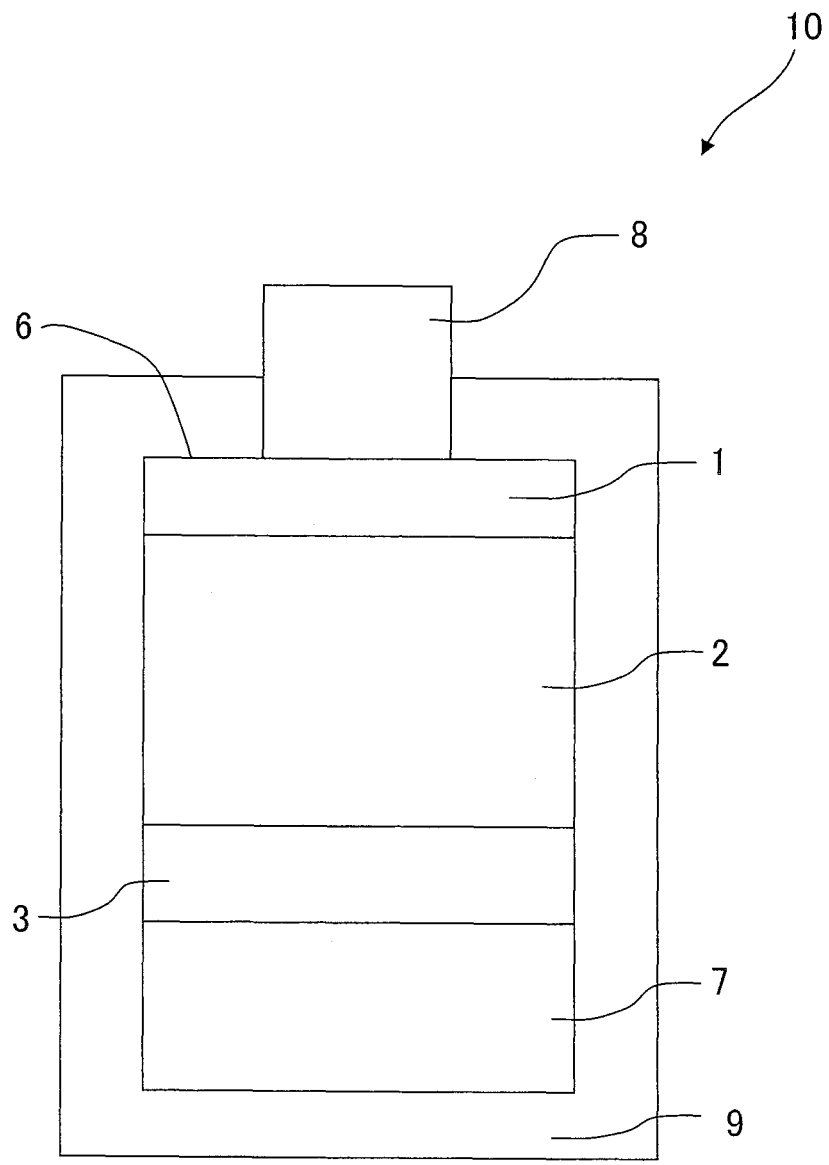
FIG. 5 is a cross-sectional schematic drawing of an F-type electrochemical cell.

As a sealed container there was used a F-type cell 10 by Hokuto Denko Corp., as shown in FIG. 5. A negative electrode collector 7 and a negative electrode layer 3 were assembled in the F-type cell 10, the prepared electrolyte solution was injected onto the negative electrode layer 3 to form an electrolyte layer 2 with a diameter of 18 mm and a thickness of 2 mm, and then a positive electrode (air electrode) layer 1 and a positive electrode collector 6 were assembled, to fabricate an evaluation cell.

Next, the F-type cell 10 was placed in a glass desiccator (500 ml) equipped with a gas exchange cock, and the atmosphere in the glass desiccator was exchanged to an oxygen atmosphere by using pure oxygen (99.9%, product of Taiyo Nippon Sanso Corp.).

Example 2-3

An evaluation cell was fabricated in the same manner as Example 1-3, except that DEME2TFSA was used as a solvent and lithium bis(trifluoromethanesulfonyl)amide (LiTFSA, product of Kojundo Chemical Laboratory Co., Ltd.) which was a lithium salt was mixed therewith to a concentration of 0.35 mol/kg and dissolved for use as an electrolyte solution, The evaluation cell was placed in a glass desiccator with an oxygen atmosphere.

Example 3-3

An evaluation cell was fabricated in the same manner as Example 1-3, except that DEME3TFSA was used as a solvent and lithium bis(trifluoromethanesulfonyl)amide (LiTFSA, product of Kojundo Chemical Laboratory Co., Ltd.) which was a lithium salt was mixed therewith to a concentration of 0.35 mol/kg and dissolved for use as an electrolyte solution. The evaluation cell was placed in a glass desiccator with an oxygen atmosphere.

Example 4-3

An evaluation cell was fabricated in the same manner as Example 1-3, except that DEME4TFSA was used as a solvent and lithium bis(trifluoromethanesulfonyl)amide (LiTFSA, product of Kojundo Chemical Laboratory Co., Ltd.) which was a lithium salt was mixed therewith to a concentration of 0.35 mol/kg and dissolved for use as an electrolyte solution. The evaluation cell was placed in a glass desiccator with an oxygen atmosphere.

Example 5-3

An evaluation cell was fabricated in the same manner as Example 1-3, except that DEMETFSA and tetraglyme (G4) were used as solvents, lithium bis(trifluoromethanesulfonyl) amide (LiTFSA, product of Kojundo Chemical Laboratory Co., Ltd.) which was a lithium salt was used as a solute, and they were mixed and dissolved so that DEMETFSA:LiTFSA: G4 was 9.2:1:0, 9:1:1, 1:9:9, 1:14:14 and 0:1:1 (molar ratios), respectively, for use as electrolyte solutions, a polypropylene nonwoven fabric separator with a diameter of 18 mm and a thickness of 40 μm was situated between a negative electrode layer 3 and a positive electrode layer 1, the prepared electrolyte solutions each were injected into the separator to form an electrolyte layer 2 with a thickness of 40 μm and an in-house made cell similar to the F-type cell 10 was used as a sealed container. The evaluation cell was placed in a glass desiccator with an oxygen atmosphere. The electrolyte solution was filled not only inside the separator but also in at least a portion of the space within the positive electrode layer, similar to Examples 1-3 to 4-3.

Example 6-3

An evaluation cell was fabricated in the same manner as Example 5-3, except that DEME2TFSA and tetraglyme (G4) were used as solvents, lithium bis(trifluoromethanesulfonyl) amide (LiTFSA, product of Kojundo Chemical Laboratory Co., Ltd.) which was a lithium salt was used as a solute, and they were mixed and dissolved so that DEME2TFSA: LiTFSA:G4 each were 9.2:1:0, 1:1:1, 1:9:9, 1:14:14, 1:19:19 and 0:1:1 (molar ratios), respectively, for use as an electrolyte solution. The evaluation cell was placed in a glass desiccator with an oxygen atmosphere.

Example 7-3

An evaluation cell was fabricated in the same manner as Example 5-3, except that DEME3TFSA and tetraglyme (G4) were used as solvents, lithium bis(trifluoromethanesulfonyl) amide (LiTFSA, product of Kojundo Chemical Laboratory Co., Ltd.) which was a lithium salt was used as a solute, and they were mixed and dissolved so that DEME3TFSA: LiTFSA:G4 each were 9.2:1:0, 9:1:1, 1:1:1, 1:14:14 and 0:1:1 (molar ratios), respectively, for use as the electrolyte solution. The evaluation cell was placed in a glass desiccator with an oxygen atmosphere.

Example 8-3

An evaluation cell was fabricated in the same manner as Example 5-3, except that N-methyl-N-methoxyethyl-piperidinium bis(trifluoromethanesulfonyl)amide (PP1.1o2TFSA) was used as a solvent and lithium bis(trifluoromethanesulfonyl)amide (LiTFSA, product of Kojundo Chemical Laboratory Co., Ltd.,) which was a lithium salt was mixed therewith to a concentration of 0.35 mol/kg and dissolved for use as an electrolyte solution. The evaluation cell was placed in a glass desiccator with an oxygen atmosphere.

Example 9-3

An evaluation cell was fabricated in the same manner as Example 5-3, except that DEMETFSA was used as a solvent and lithium bis(trifluoromethanesulfonyl)amide (LiTFSA, product of Kojundo Chemical Laboratory Co., Ltd.,) which was a lithium salt was mixed therewith to a concentration of 0.35 mol/kg and dissolved for use as an electrolyte solution. The evaluation cell was placed in a glass desiccator with an oxygen atmosphere.

Comparative Example 1-3

An evaluation cell was fabricated in the same manner as Example 1-3, except that PP13TFSA was used as a solvent and lithium bis(trifluoromethanesulfonyl)amide (LiTFSA, product of Kojundo Chemical Laboratory Co., Ltd.,) which was a lithium salt was mixed therewith to a concentration of 0.35 mol/kg and dissolved for use as an electrolyte solution. The evaluation cell was placed in a glass desiccator with an oxygen atmosphere.

Reference Example 1-3

An evaluation cell was fabricated in the same manner as Example 1-3, except that N1223TFSA was used as a solvent and lithium bis(trifluoromethanesulfonyl)amide (LiTFSA, product of Kojundo Chemical Laboratory Co., Ltd.,) which was a lithium salt was mixed therewith to a concentration of 0.35 mol/kg and dissolved for use as an electrolyte solution. The evaluation cell was placed in a glass desiccator with an oxygen atmosphere.

(Measurement of I-V Characteristic)

The air batteries employing the electrolyte solutions containing DEMETFSA and DEME2TFSA prepared in Examples 1-3 and 2-3 and the air batteries employing the electrolyte solutions containing PP13TFSA and N1223TFSA prepared in Comparative Example 1-3 and Reference Example 1-3 were evaluated for current voltage (I-V) characteristics, under the following conditions.

Each air battery placed in the glass desiccator was allowed to stand for 3 hours in a thermostatic bath at 25° C. before the start of the test. Next, a multichannel potentiostat/galvanostat VMP3 (product of Bio-Logic) charge-discharge I-V measuring apparatus was used to measure the I-V characteristic under an oxygen atmosphere at 25° C., 1 atmosphere, with a current application time/rest time ratio of 30 minutes/0.1 second.

Figure 4:
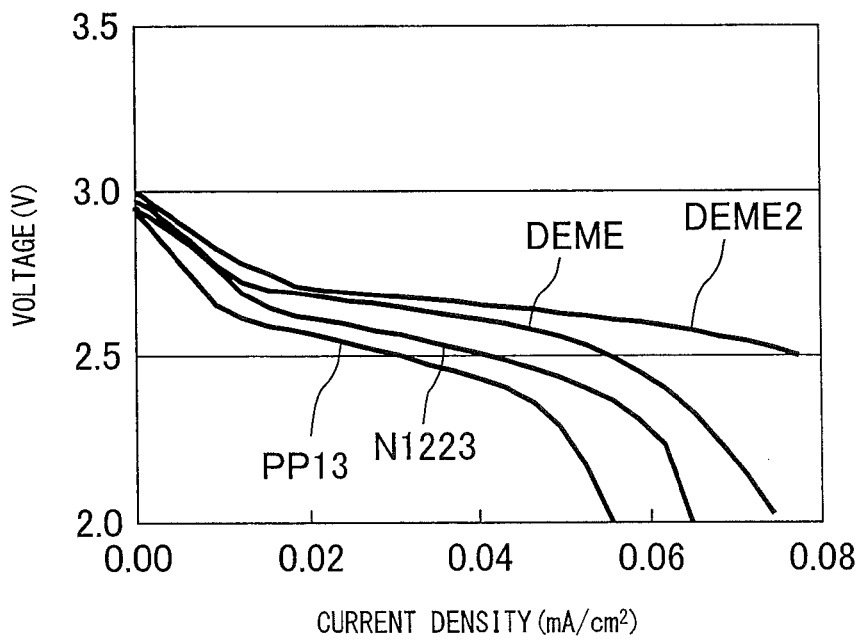
FIG. 4 is a graph showing I-V characteristics of air batteries.

FIG. 4 shows the I-V characteristic measured as the voltage value with respect to current density per unit area of the positive electrode. The air batteries employing the electrolyte solutions containing DEMETFSA and DEME2TFSA fabricated in Example 1-3 and Example 2-3 had more excellent I-V characteristics and were able to provide higher output, compared to the air batteries employing the electrolyte solutions containing PP13TFSA and N1223TFSA fabricated in Comparative Example 1-3 and Reference Example 1-3.

(Measurement of Coulombic Efficiency)

The metal-air batteries employing the electrolyte solutions containing DEMETFSA, DEME2TFSA and DEME4TFSA fabricated in Examples 1-3, 2-3 and 4-3, and the metal-air battery employing the electrolyte solution containing PP13TFSA fabricated in Comparative Example 1-3, were subjected to a charge-discharge test under the following conditions, and the coulombic efficiency was measured.

Each metal-air battery placed in the glass desiccator was allowed to stand for 3 hours in a thermostatic bath at 60° C. before the start of the test. Next, a multichannel potentiostat/galvanostat VMP3 (product of Bio-Logic) charge-discharge I-V measuring apparatus was used for a charge-discharge test at 0.04 mA/cm$^2$, under conditions of 60° C., pure oxygen, 1 atmosphere, with a positive electrode area of 2.5 cm$^2$.

The metal-air batteries fabricated in Examples 1-3, 2-3 and 4-3 and Comparative Example 1-3 start from the discharge process, and therefore the coulombic efficiencies were calculated by the following formula.

Coulombic efficiency=(charge capacity at each cycle)/(discharge capacity at each cycle)

Figure 8:
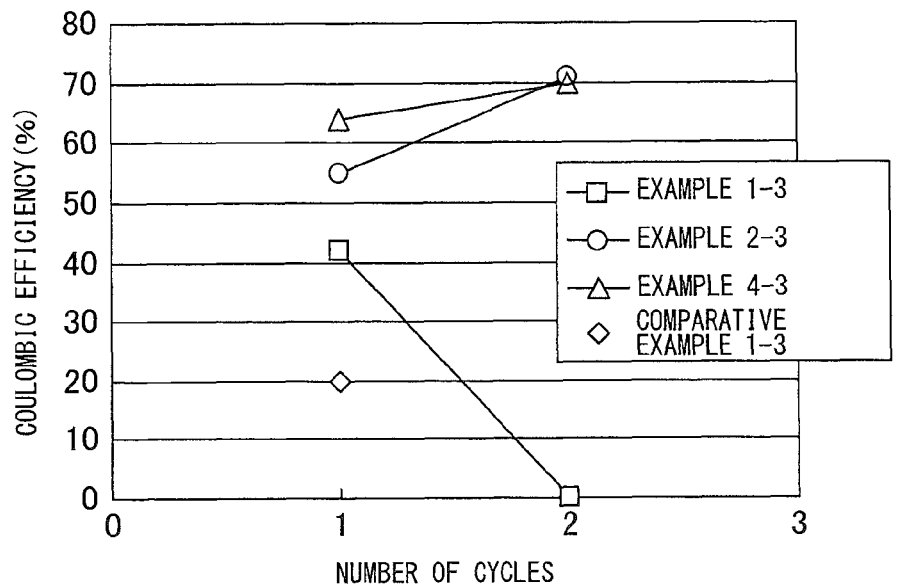
FIG. 8 is a graph showing the relationship between numbers of cycles and coulombic efficiencies of air batteries, with different solvents.

The coulombic efficiencies of the metal-air batteries fabricated in Examples 1-3, 2-3 and 4-3 and Comparative Example 1-3 are shown in Table 1 and FIG. 8.

TABLE 1

| | Number of cycles | Coulombic efficiency (%) |
|---|---|---|
| Example 1-3 | 1 | 42 |
| | 2 | 0 |
| Example 2-3 | 1 | 55 |
| | 2 | 71 |
| Example 4-3 | 1 | 64 |
| | 2 | 70 |
| Comp. Ex. 1-3 | 1 | 20 |

The initial coulombic efficiency of the metal-air battery employing the electrolyte solution containing PP13TFSA fabricated in Comparative Example 1-3 was 20%, while the initial coulombic efficiencies of the metal-air batteries employing the electrolyte solutions containing DEMETFSA, DEME2TFSA and DEME4TFSA fabricated in Examples 1-3, 2-3 and 4-3 were 42%, 55% and 64%, respectively, demonstrating high initial coulombic efficiencies. Among DEMETFSA, DEME2TFSA and DEME4TFSA, a larger number of ether groups tended to result in higher initial coulombic efficiency. Also, the second coulombic efficiencies of the metal-air batteries employing the electrolyte solutions containing DEMETFSA, DEME2TFSA and DEME4TFSA fabricated in Example 1-3, 2-3 and 4-3 were 0%, 71% and 70%, and thus higher coulombic efficiencies were obtained for metal-air batteries employing electrolyte solutions with larger Li$_2$O$_2$ dissolution levels.

(Evaluation of Increased Output by Proportion of Ionic Liquid and Organic Solvent)

The current voltage (I-V) characteristics of the air battery employing the electrolyte solution containing DEMETFSA and G4 fabricated in Example 5-3, the air battery employing the electrolyte solution containing DEME2TFSA and G4 fabricated in Example 6-3 and the air battery employing the electrolyte solution containing DEME3TFSA and G4 fabricated in Example 7-3 were evaluated under the following conditions.

Each air battery placed in the glass desiccator was allowed to stand for 3 hours in a thermostatic bath at 60° C. before the start of the test. Next, a multichannel potentiostat/galvanostat VMP3 (product of Bio-Logic) charge-discharge I-V measuring apparatus was used to measure the I-V characteristic under an oxygen atmosphere at 60° C., 1 atmosphere, with a current application time/rest time ratio of 30 minutes/0.1 second, and the current densities at a cut voltage of 2.3 V were compared.

Figure 11:
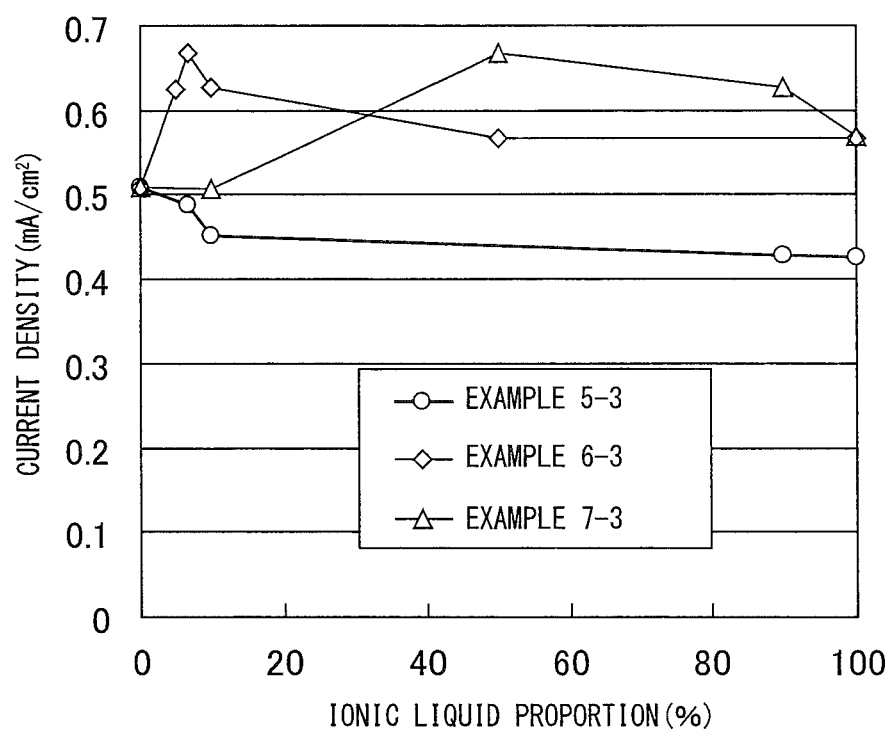
FIG. 11 is a graph showing the relationship between proportions of ionic liquids in electrolyte solutions containing ionic liquids and organic solvents, and the current densities of air batteries.

FIG. 11 and Table 2 show the current densities per unit area of the positive electrode at a cut voltage of 2.3 V, based on the proportion of ionic liquid, for each of the air batteries prepared in Examples 5-3, 6-3 and 7-3. The ionic liquid proportion (%) is the molar ratio (%) of the ionic liquid with respect to the total of the ionic liquid and tetraglyme.

TABLE 2

| Ionic liquid:LiTFSA:G4 composition ratio | Ionic liquid content (%) | Current density at 2.3 V (mA/cm$^2$) | | |
|---|---|---|---|---|
| | | Example 5-3 | Example 6-3 | Example 7-3 |
| 9.2:1:0 | 100 | 0.426 | 0.568 | 0.569 |
| 9:1:1 | 90 | 0.429 | — | 0.628 |
| 1:1:1 | 50 | — | 0.567 | 0.668 |
| 1:9:9 | 10 | 0.452 | 0.627 | 0.508 |

TABLE 2-continued

| Ionic liquid:LiTFSA:G4 composition ratio | Ionic liquid content (%) | Current density at 2.3 V (mA/cm$^2$) | | |
|---|---|---|---|---|
| | | Example 5-3 | Example 6-3 | Example 7-3 |
| 1:14:14 | 6.7 | 0.489 | 0.668 | — |
| 1:19:19 | 5 | — | 0.626 | — |
| 0:1:1 | 0 | 0.509 | 0.510 | 0.510 |

The air battery employing the electrolyte solution containing DEMETFSA and G4 fabricated in Example 5-3 exhibited higher current density with increasing tetraglyme proportion. The air battery employing the electrolyte solution containing DEME2TFSA and G4 fabricated in Example 6-3 exhibited higher current density than the air battery fabricated in Example 5-3, with the highest current density being exhibited with an ionic liquid proportion of 6.7%. The air battery employing the electrolyte solution containing DEME3TFSA and G4 fabricated in Example 7-3 exhibited higher current density than the air battery fabricated in Example 5-3, a higher current density than Example 6-3 being exhibited with an ionic liquid proportion of 32% or greater and especially 50% or greater. Thus, lithium-air battery output was further increased by using an electrolyte solution comprising a combination of an ionic liquid and an organic solvent. Also, by combining an organic solvent and an ionic liquid with higher solubility for lithium oxides, it was possible to achieve further increased output for a lithium-air battery.

(Evaluation of Output Increase by Ionic Liquid Containing Cyclic Structure)

The current voltage (I-V) characteristics of the air batteries employing the electrolyte solutions containing PP1.1o2TFSA and DEMETFSA fabricated in Example 8-3 and Example 9-3 were evaluated under the following conditions.

Each air battery placed in the glass desiccator was allowed to stand for 3 hours in a thermostatic bath at 60° C. before the start of the test. Next, a multichannel potentiostat/galvanostat VMP3 (product of Bio-Logic) charge-discharge I-V measuring apparatus was used to measure the I-V characteristic under an oxygen atmosphere at 60° C., 1 atmosphere, with a current application time/rest time ratio of 30 minutes/0.1 second.

Figure 12:
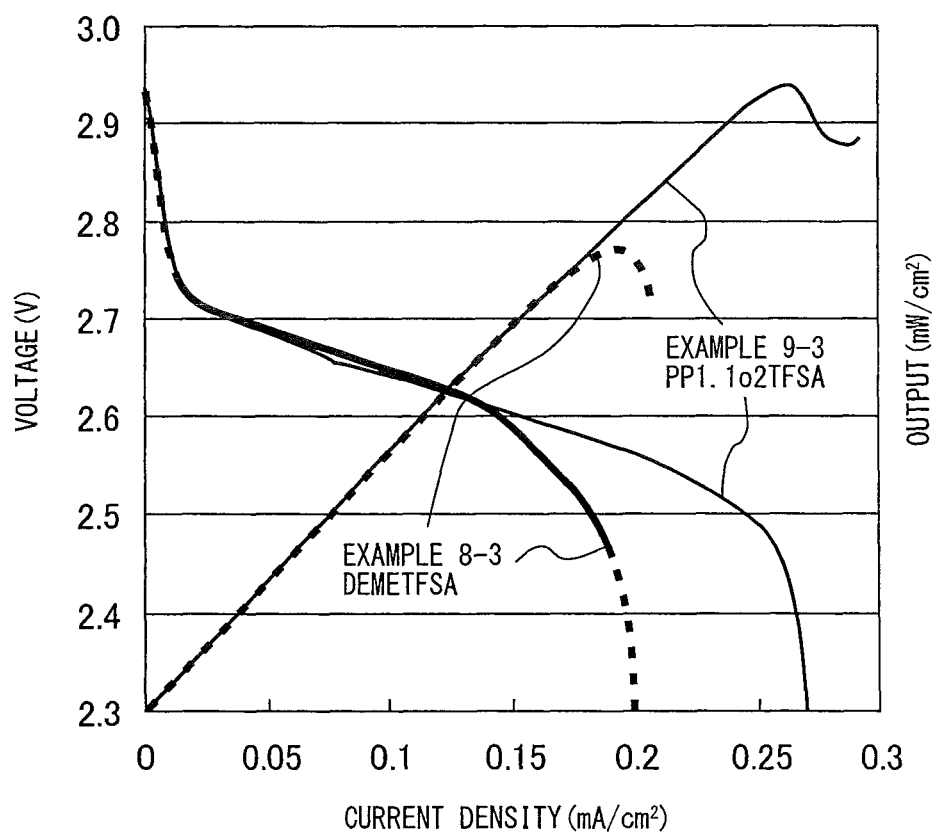
FIG. 12 is a graph showing the relationship between current densities of air batteries, against voltages and outputs, with different solvents.

FIG. 12 shows the relationship between voltage value and output with respect to current density, for the air batteries fabricated in Example 8-3 and Example 9-3. The air battery fabricated in Example 8-3 had an even higher I-V (output) characteristic than the air battery containing DEMETFSA in the electrolyte solution, fabricated in Example 9-3, since production of lithium oxides was even further facilitated. Table 3 shows power density and current density at a cut voltage of 2.3 V.

TABLE 3

| | Power density at cut voltage of 2.3 V (mW/cm$^2$) | Current density at cut voltage of 2.3 V (mA/cm$^2$) |
|---|---|---|
| Example 8-3 | 0.62 | 0.270 |
| Example 9-3 | 0.45 | 0.199 |

The air battery containing PP1.1o2TFSA in the electrolyte solution, fabricated in Example 8-3, exhibited a further output increase of about 37% compared to the air battery containing DEMETFSA in the electrolyte solution, fabricated in Example 9-3.

(Calculation of Total Bonding Strength)

The total bonding strength between the solvent used in the electrolyte solution and the $Li_2O_2$ was calculated in the following manner by quantum chemical computation. The computation program software used was Gaussian 03 Rev D.01, using Rb3lyp/6-31G (d) as the calculation method and base.

(1) For $Li_2O_2$, a molecular model was created with single bonds formed between the oxygen atoms and one lithium atom coordinated with each oxygen atom, and this was structurally optimized by quantum chemical computation.

(2) A molecular model was created for one solvent molecule or cation, and this was structurally optimized by quantum chemical computation.

(3) The $Li_2O_2$ molecule structurally optimized in (1) was configured at various positions around the molecular model of the single solvent molecule or cation structurally optimized in (2), and the overall system was structurally optimized.

(4) The total energies, interatomic distances and interatomic bond orders (Wiberg bond indexes) were calculated for the overall system.

(5) A stable structure was selected within +10 kcal/mol from the lowest total energy calculated in (4).

(6) For the stable structure selected in (5), the interatomic distances between Li or O of the $Li_2O_2$ molecules and the atoms of solvent were measured and bonds with interatomic distances between the $Li_2O_2$ molecules and solvent molecules of no greater than 2.1 angstrom were selected.

(7) The total bond order of the bonds selected in (6) and the number of stable structures having the bonds selected in (6) were calculated, and the total bonding strength per stable structure was calculated from the following formula:

Total bonding strength=(total bond order of bonds selected in (6))/(number of stable structures with bonds selected in (6)).

For DEME3 used in Example 3-1, seven stable structures were obtained in (2) to (4) above, four stable structures were selected within +10 kcal/mol from the lowest total energy in (5), and 17 bonds with interatomic distances of no greater than 2.1 angstrom between the $Li_2O_2$ and cationic molecules were selected from among the four stable structures in (6). Next, the total value of the bond order of the 17 selected bonds in (7) was divided by the number of stable structures (four), and a total bonding strength value of 0.2049 was computed. Similarly, the total bonding strengths with $Li_2O_2$ were calculated for DEME, DEME2, DEME4, PP13, G4 and N1223 used in Examples 1-1, 2-1 and 4-1, Comparative Examples 1-1 and 2-1 and Reference Example 1-1.

Figure 6:
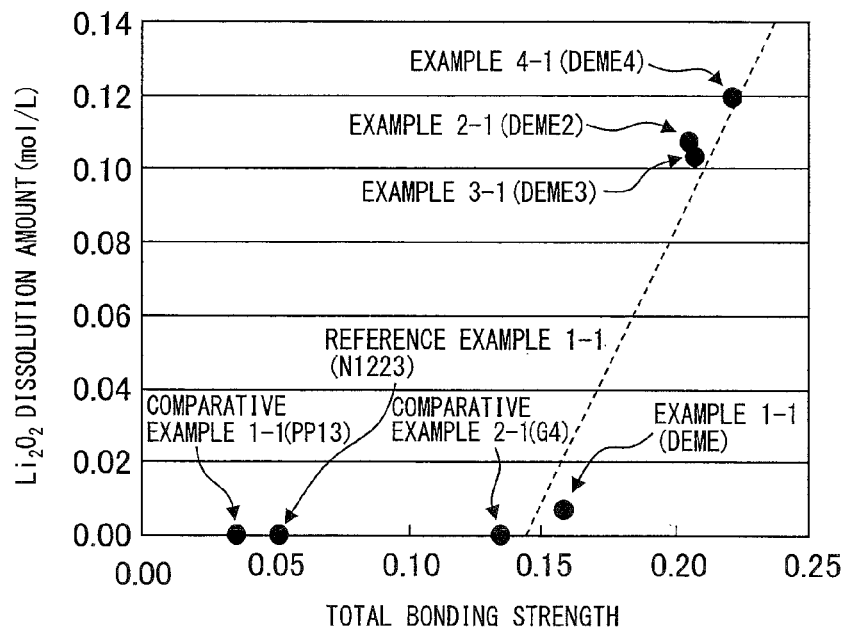
FIG. 6 is a graph showing the relationship between total $Li_2O_2$ bonding strengths of solvents and $Li_2O_2$ solubilities of solvents.

Table 4 and FIG. 6 show the relationship between total bonding strengths with $Li_2O_2$ for DEME, DEME2, DEME3, DEME4, PP13, G4 and N1223, and $Li_2O_2$ dissolution amounts for DEMETFSA, DEME2TFSA, DEME3TFSA, DEME4TFSA, PP13TFSA, G4 and N1223TFSA.

TABLE 4

| | Total bonding strength | $Li_2O_2$ dissolution (mol/L) |
|---|---|---|
| Example 1-1 | 0.1590 | 0.007 |
| Example 2-1 | 0.2072 | 0.103 |
| Example 3-1 | 0.2049 | 0.107 |
| Example 4-1 | 0.2214 | 0.119 |
| Comp. Ex. 1-1 | 0.0520 | 0 |
| Comp. Ex. 2-1 | 0.1350 | 0 |
| Ref. Ex. 1-1 | 0.0362 | 0 |

DEME, DEME2, DEME3 and DEME4, which had total bonding strengths of 0.14 or greater, exhibited $Li_2O_2$ dissolution amounts of 0.005 mol/L or greater, with DEME2, DEME3 and DEME4 in particular exhibiting $Li_2O_2$ dissolution amounts of 0.1 mol/L or greater, and higher total bonding strengths tending to result in increased $Li_2O_2$ solubility. PP1.1o2 is also a quaternary ammonium cation with a hydrocarbon group and an electron-donating functional group, similar to the DEME-based structure, and therefore the total bonding strength with $Li_2O_2$ is 0.14 or greater, and the $Li_2O_2$ dissolution amount is estimated to be 0.005 mol/L or greater.

(Evaluation of Discharge Test)

Example 1-4

90 mass % of carbon black (ECP600JD by Ketjen Black International), 10 mass % of a polytetrafluoroethylene (PTFE) binder (product of Daikin Industries, Ltd.) and an appropriate amount of ethanol as a solvent was mixed to obtain a mixture. Next, the obtained mixture was rolled with a roll press and dried and cut. A SUS304 100 mesh (product of Nilaco Corp.) was used as a collector, the cut mixture and the collector were pressure-bonded, and this was then subjected to hot vacuum drying to form a positive electrode layer with a diameter of 18 mm and a thickness of 150 μm, pressure-bonded to a mesh-like collector.

Using DEMETFSA as a solvent, lithium bis(trifluoromethanesulfonyl)amide (LiTFSA, product of Kojundo Chemical Laboratory Co., Ltd.) which was a lithium salt was mixed at a concentration of 0.35 mol/kg at 60° C. for 5 hours under an Ar atmosphere and dissolved to prepare an electrolyte solution.

As a negative electrode layer there was prepared a metal lithium foil (product of Honjo Metal Co., Ltd.) with a diameter of 18 mm and a thickness of 250 μm, and this was attached to a SUS304 (product of Nilaco Corp.) collector with a diameter of 18 mm and a thickness of 2 cm.

As a sealed container there was used an F-type cell 10 by Hokuto Denko Corp., as shown in FIG. 5. A negative electrode collector 7 and a negative electrode layer 3 were assembled in the F-type cell 10, the prepared electrolyte solution was injected in a polyolefin-based separator (product of Nippon Sheet Glass Co., Ltd.) with a diameter of 18 mm and a thickness of 40 μm situated on the negative electrode layer 3 to form an electrolyte layer 2, and then a positive electrode (air electrode) layer 1 and a positive electrode collector 6 were assembled, to fabricate an evaluation cell.

Next, the F-type cell 10 was placed in a glass desiccator (500 ml) equipped with a gas exchange cock, and the atmosphere in the glass desiccator was exchanged to an oxygen atmosphere by using pure oxygen (99.9%, product of Taiyo Nippon Sanso Corp.).

Example 2-4

An evaluation cell was fabricated in the same manner as Example 1-4, except that DEME2TFSA was used as a solvent and lithium bis(trifluoromethanesulfonyl)amide (LiTFSA, product of Kojundo Chemical Laboratory Co., Ltd.,) which was a lithium salt was mixed therewith to a concentration of 0.35 mol/kg and dissolved for use as an electrolyte solution. The evaluation cell was placed in a glass desiccator with an, oxygen atmosphere.

Example 3-4

An evaluation cell was fabricated in the same manner as Example 1-4, except that DEME3TFSA was used as a solvent and lithium bis(trifluoromethanesulfonyl)amide (LiTFSA, product of Kojundo Chemical Laboratory Co., Ltd.,) which was a lithium salt was mixed therewith to a concentration of 0.35 mol/kg and dissolved for use as an electrolyte solution. The evaluation cell was placed in a glass desiccator with an oxygen atmosphere.

Example 4-4

An evaluation cell was fabricated in the same manner as Example 1-4, except that DEME4TFSA was used as a solvent and lithium bis(trifluoromethanesulfonyl)amide (LiTFSA, product of Kojundo Chemical Laboratory Co., Ltd.,) which was a lithium salt was mixed therewith to a concentration of 0.35 mol/kg and dissolved for use as an electrolyte solution. The evaluation cell was placed in a glass desiccator with an oxygen atmosphere.

Comparative Example 1-4

An evaluation cell was fabricated in the same manner as Example 1-4, except that PP13TFSA was used as a solvent and lithium bis(trifluoromethanesulfonyl)amide (LiTFSA, product of Kojundo Chemical Laboratory Co., Ltd.,) which was a lithium salt was mixed therewith to a concentration of 0.35 mol/kg and dissolved for use as an electrolyte solution. The cell was placed in a glass desiccator with an oxygen atmosphere.

Comparative Example 2-4

An evaluation cell was fabricated in the same manner as Example 1-4, except that G4 was used as a solvent and lithium bis(trifluoromethanesulfonyl)amide (LiTFSA, product of Kojundo Chemical Laboratory Co., Ltd.,) which was a lithium salt was mixed therewith to a concentration of 4.5 mol/kg and dissolved for use as an electrolyte solution. The evaluation cell was placed in a glass desiccator with an oxygen atmosphere.

(Relationship Between $Li_2O_2$ Dissolution Amount and Discharge Capacity)

Figure 7:
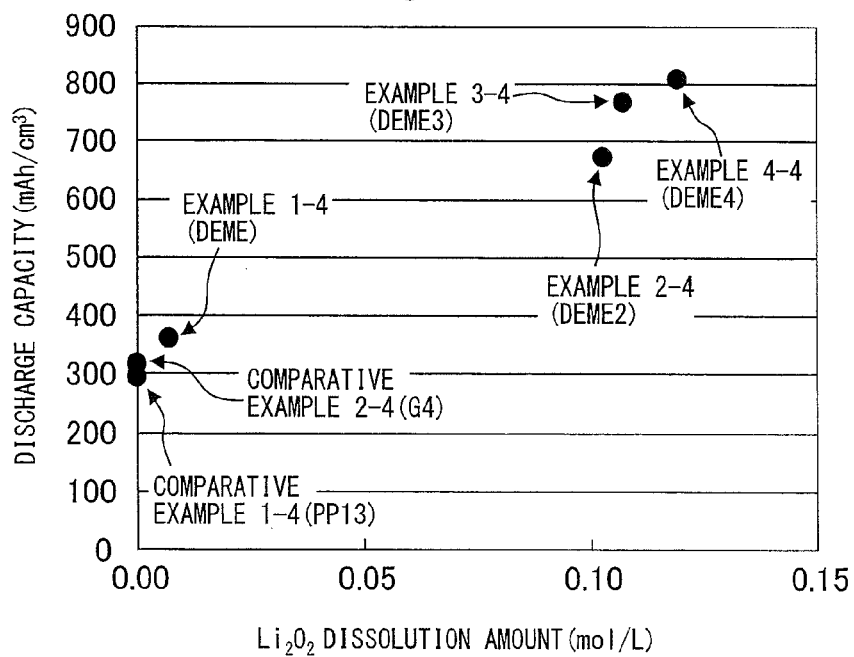
FIG. 7 is a graph showing the relationship between $Li_2O_2$ solubilities of solvents and the discharge capacities of air batteries employing electrolyte solutions containing each of the solvents.

Table 5 and FIG. 7 show the relationship between the $Li_2O_2$ dissolution amounts by the solvents and the discharge capacities of air batteries using the solvents as electrolyte solutions, for the air batteries using electrolyte solutions containing DEMETFSA, DEME2TFSA, DEME3TFSA and DEME4TFSA fabricated in Examples 1-4, 2-4, 3-4 and 4-4, and the air batteries using electrolyte solutions containing PP13TFSA and G4 fabricated in Comparative Examples 1-4 and 2-4.

The discharge capacities were measured by allowing each metal-air battery placed in the glass desiccator to stand for 3 hours in a thermostatic bath at 60° C. before start of the test, and then using a multichannel potentiostat/galvanostat VMP3 (product of Bio-Logic) charge-discharge I-V measuring apparatus under conditions of 60° C., pure oxygen, 1 atmosphere, and performing discharge capacity measurement when the cell voltage reached 2.3 V with a positive electrode area of 2.5 cm² (diameter: 18 mm) and a current density of 0.04 mA/cm².

TABLE 5

| | $Li_2O_2$ dissolution (mol/L) | Discharge capacity (mAh/cm³) |
|---|---|---|
| Example 1-4 | 0.007 | 360 |
| Example 2-4 | 0.103 | 674 |

TABLE 5-continued

|  | Li$_2$O$_2$ dissolution (mol/L) | Discharge capacity (mAh/cm$^3$) |
| --- | --- | --- |
| Example 3-4 | 0.107 | 766 |
| Example 4-4 | 0.119 | 810 |
| Comp. Ex. 1-4 | 0 | 295 |
| Comp. Ex. 2-4 | 0 | 317 |

An increase in discharge capacity tended to be exhibited with air batteries using solvents with greater Li$_2$O$_2$ dissolution amounts, and in particular the air batteries using electrolyte solutions containing DEME2TFSA, DEME3TFSA and DEME4TFSA fabricated in Examples 2-4, 3-4 and 4-4 exhibited discharge capacities 2 or more times greater than the air batteries using electrolyte solutions containing PP13TFSA and G4 fabricated in Comparative Examples 1-4 and 2-4.

(Measurement of Power Density)

The power densities of the metal-air batteries using electrolyte solutions containing DEMETFSA and DEME2TFSA fabricated in Examples 1-4 and 2-4 were evaluated under the following conditions.

Each air battery placed in the glass desiccator was allowed to stand for 3 hours in a thermostatic bath at 60° C. before the start of the test. Next, a multichannel potentiostat/galvanostat VMP3 (product of Bio-Logic) charge-discharge I-V measuring apparatus was used for measurement of the I-V characteristic, with a positive electrode area of 2.5 cm$^2$ (diameter: 18 mm) under an oxygen atmosphere at 60° C., 1 atmosphere, and with a cut voltage of 2.3 V and a constant current retention time of 30 minutes, varying the conditions of the measuring current density. The power density was calculated by the following formula:

Power density=(applied current density)×(voltage after 30 minutes of constant current test).

Figure 9:
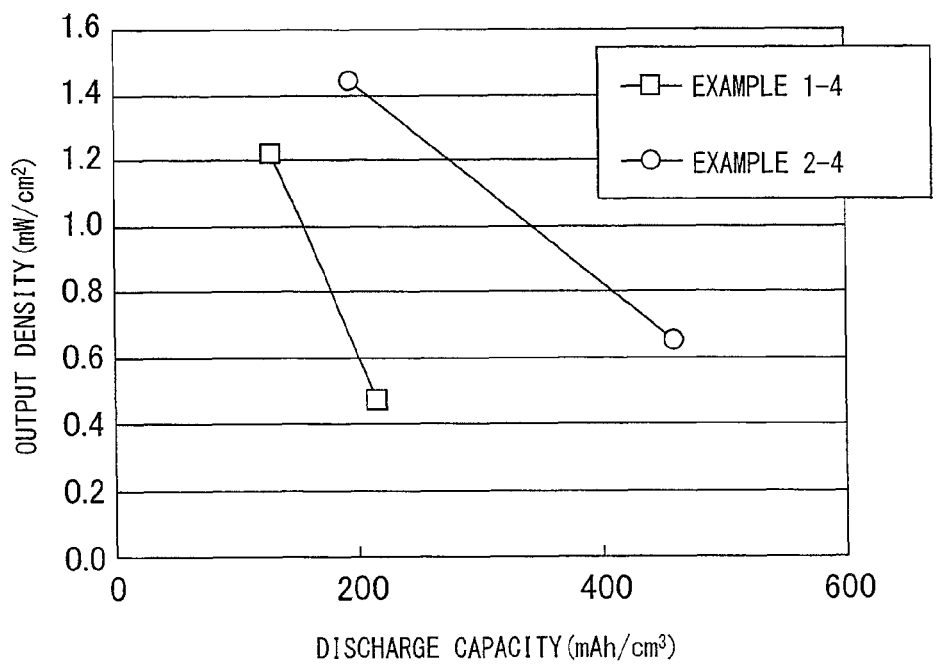
FIG. 9 is a graph showing the relationship between discharge capacities and power densities of air batteries, with different solvents.

Table 6 and FIG. 9 show the value of the power density with respect to discharge capacity.

TABLE 6

|  | Discharge capacity (mAh/cm$^3$) | Output density (mW/cm$^2$) |
| --- | --- | --- |
| Example 1-4 | 130 | 1.22 |
|  | 215 | 0.47 |
| Example 2-4 | 195 | 1.44 |
|  | 459 | 0.65 |

The air battery using the electrolyte solution containing DEME2TFSA fabricated in Example 2-4 exhibited higher power density than the air battery using the electrolyte solution containing DEMETFSA fabricated in Example 1-4. As shown in Table 4, DEME2TFSA exhibited higher Li$_2$O$_2$ solubility than DEMETFSA, and the air battery using the electrolyte solution containing DEME2TFSA had less reduction in output during discharge.

EXPLANATION OF SYMBOLS

1 Positive electrode layer
2 Electrolyte layer
3 Negative electrode layer
6 Positive electrode collector
7 Negative electrode collector
8 Gas reservoir
9 Sealed container
10 F-type electrochemical cell

What is claimed is:

1. An electrolyte solution for a lithium-air battery, comprising an ionic liquid,
wherein the total bonding strength with Li$_2$O$_2$ is 0.20 or greater, and
wherein the ionic liquid contains an ammonium cation (DEME3) represented by formula (3):

[Chemical Formula 3]

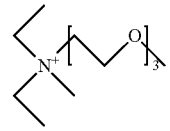

(3)

an ammonium cation (DEME4) represented by formula (4):

[Chemical Formula 4]

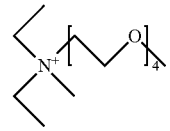

(4)

or combination thereof, and
bis(trifluoromethanesulfonyl)amide (TFSA) anion represented by formula (6):

[Chemical Formula 6]

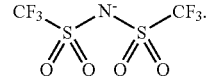

(6)

2. An electrolyte solution according to claim 1, wherein the electrolyte solution further contains an organic solvent.

3. An electrolyte solution according to claim 1, wherein the electrolyte solution includes a lithium-containing metal salt.

4. An electrolyte solution according to claim 3, wherein the lithium-containing metal salt is lithium bis(trifluoromethanesulfonyl)amide (LiTFSA).

5. A lithium-air battery comprising:
a positive electrode layer;
a negative electrode layer; and
an electrolyte layer situated between the air positive electrode layer and the negative electrode layer,
wherein the electrolyte layer contains an electrolyte solution according to claim 1.

* * * * *